US012644726B1

(12) United States Patent
McNinch

(10) Patent No.: US 12,644,726 B1
(45) Date of Patent: Jun. 2, 2026

(54) SYSTEM AND PROCESSES INVOLVING SUBMERGED HAZARD MAPPING

(71) Applicant: SEALASKA CORPORATION, Seattle, WA (US)

(72) Inventor: Jesse Elwyn McNinch, Seattle, WA (US)

(73) Assignee: SEALASKA CORPORATION, Seattle, WA (US)

( * ) Notice: Subject to any disclaimer, the term of this patent is extended or adjusted under 35 U.S.C. 154(b) by 216 days.

(21) Appl. No.: 18/118,036

(22) Filed: Mar. 6, 2023

Related U.S. Application Data

(63) Continuation of application No. 17/991,833, filed on Nov. 21, 2022, now abandoned.

(60) Provisional application No. 63/281,584, filed on Nov. 19, 2021.

(51) Int. Cl.
*G01C 21/00* (2006.01)

(52) U.S. Cl.
CPC ................................. *G01C 21/3844* (2020.08)

(58) Field of Classification Search
CPC .................................................. G01C 21/3844
See application file for complete search history.

(56) References Cited

U.S. PATENT DOCUMENTS

2003/0071751 A1* 4/2003 Barrick ............... G01S 13/0218
342/191
2006/0238406 A1* 10/2006 Nohara ................... G01S 7/068
342/197

2009/0087029 A1* 4/2009 Coleman .............. G06V 10/255
382/103
2011/0313655 A1* 12/2011 Litvack .................. G01C 21/20
701/426
2012/0020527 A1* 1/2012 Abileah ................. G06V 20/13
382/106
2013/0222115 A1* 8/2013 Davoodi .................. H04Q 9/00
340/10.1
2023/0221123 A1* 7/2023 Gabriel ..................... G06T 7/74
342/44

FOREIGN PATENT DOCUMENTS

CN 109116320 A * 1/2019 .............. G01S 7/41
WO WO-9401899 A1 * 1/1994 .............. H01Q 1/42

OTHER PUBLICATIONS

CN 109116320—machine translation (Year: 2019).*

* cited by examiner

*Primary Examiner* — Helal A Algahaim
*Assistant Examiner* — Patrick M Brady

(57) ABSTRACT

This invention relates generally to systems and processes involving hazard mapping. In one embodiment, a system includes, but is not limited to, an IMU; a radar system; a GPS receiver; and at least one computer processor configured to perform operations including at least: obtaining motion data, radar data, and position data obtained using the IMU, the radar system, and the GPS receiver, respectively, co-registering the radar data, the position data, and the motion data in a cartesian 3D matrix, and determining at least one hazard involving geomorphology, surface current, wave, or bathymetry at least partly using the 3D matrix, and GIS-referencing the hazard to imagery for output.

21 Claims, 28 Drawing Sheets

FIGURE 2

200

```
┌─────────────────────────────────────────────────────┐
│                         202                          │
│           GENERATING HEADING & PITCH STRINGS          │
└─────────────────────────────────────────────────────┘
                          │
                          ▼
┌─────────────────────────────────────────────────────┐
│                         204                          │
│              GENERATING RADAR PULSE STRINGS           │
└─────────────────────────────────────────────────────┘
                          │
                          ▼
┌─────────────────────────────────────────────────────┐
│                         206                          │
│           GENERATING TIME AND POSITION STRINGS        │
└─────────────────────────────────────────────────────┘
                          │
                          ▼
┌─────────────────────────────────────────────────────┐
│                         208                          │
│        OBTAINING RADAR, MOTION, AND POSITION STRINGS  │
└─────────────────────────────────────────────────────┘
                          │
                          ▼
┌─────────────────────────────────────────────────────┐
│                         210                          │
│  CO-REGISTERING RADAR, POSITION AND MOTION DATA IN A  │
│                  CARTESIAN 3-D MATRIX                 │
└─────────────────────────────────────────────────────┘
                          │
                          ▼
┌─────────────────────────────────────────────────────┐
│                         212                          │
│  DETERMINING GEOMORPHOLOGY, SURFACE CURRENT, WAVE,    │
│         BATHYMETRY PARAMATER OR HAZARD                │
└─────────────────────────────────────────────────────┘
                          │
                          ▼
┌─────────────────────────────────────────────────────┐
│                         214                          │
│  GIS-REFERENCING TO TOPOGRAPHICAL OR BATHYMETRY IMAGERY│
└─────────────────────────────────────────────────────┘
                          │
                          ▼
┌─────────────────────────────────────────────────────┐
│                         216                          │
│             OUTPUTTING TO A USER INTERFACE            │
└─────────────────────────────────────────────────────┘
```

DEPTH PROFILE

SHORE SLOPE (deg) = 3.9

FIGURE 6
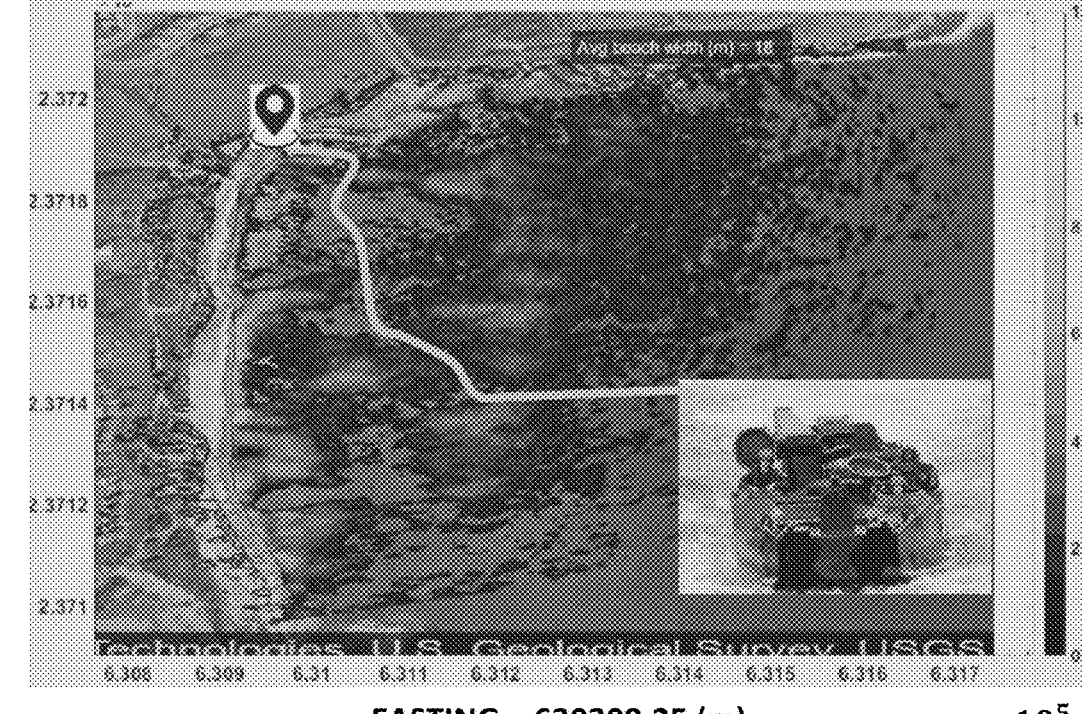

FIGURE 7
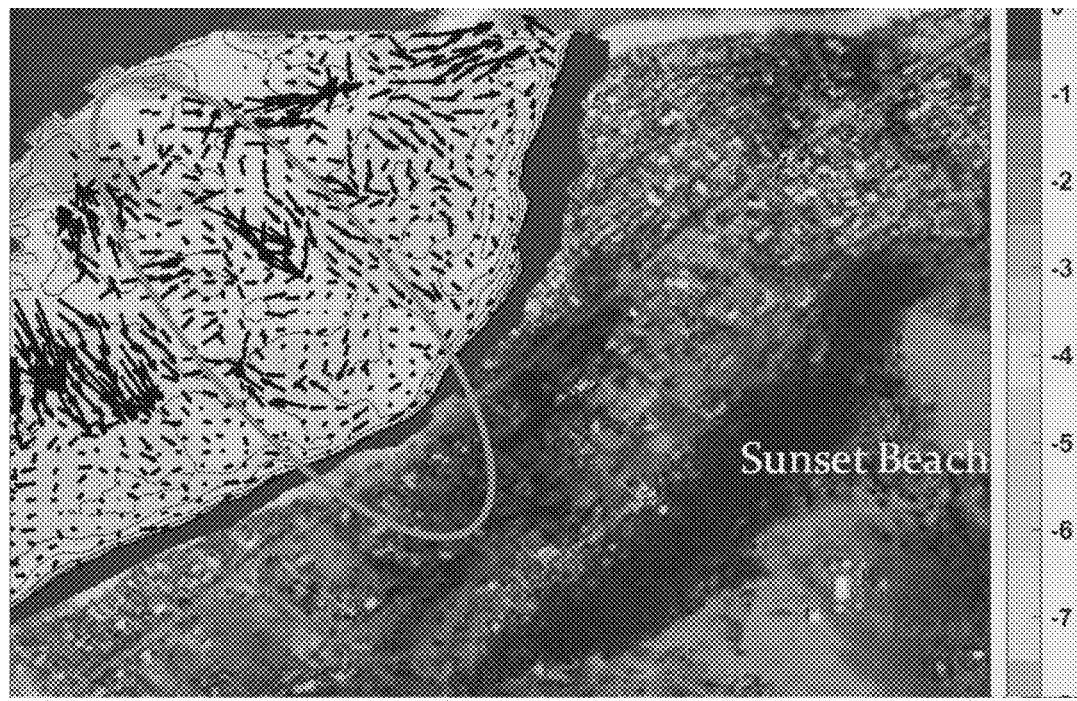
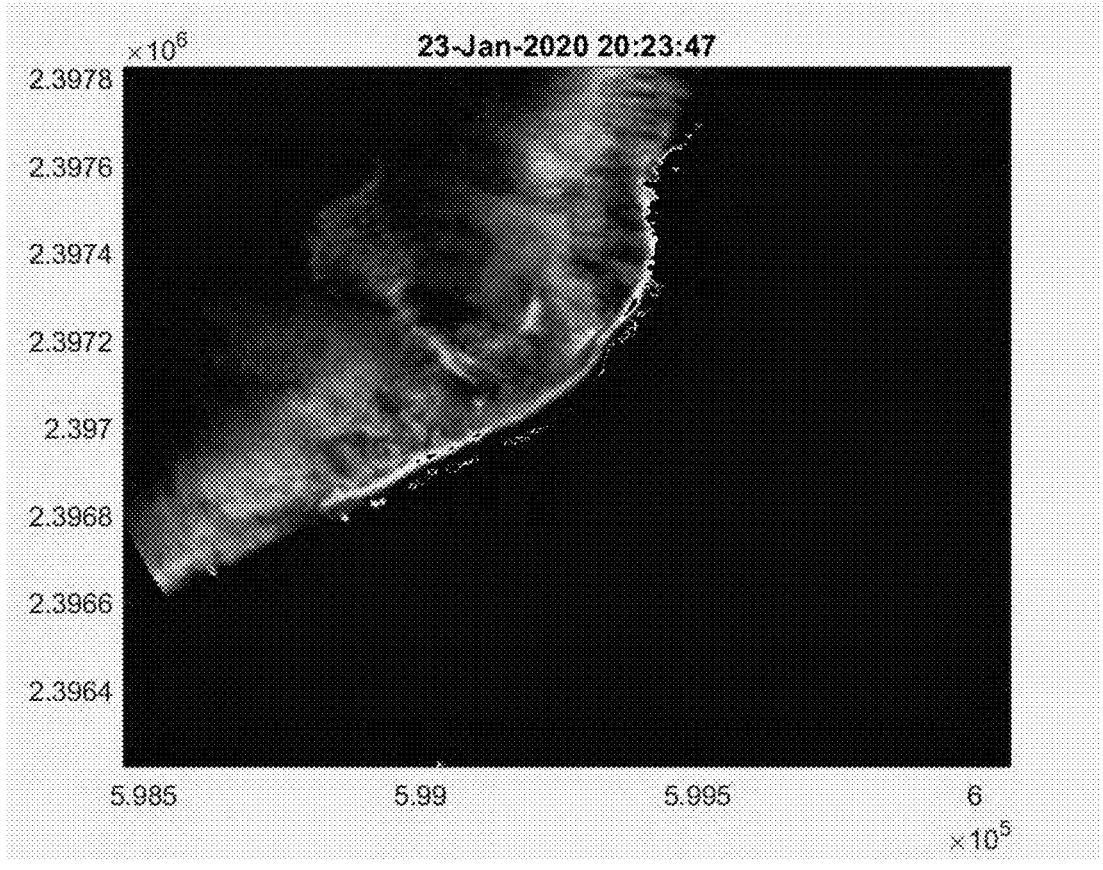

802

804

806

804

SIDE VIEW

TOP VIEW

804

FIGURE 9
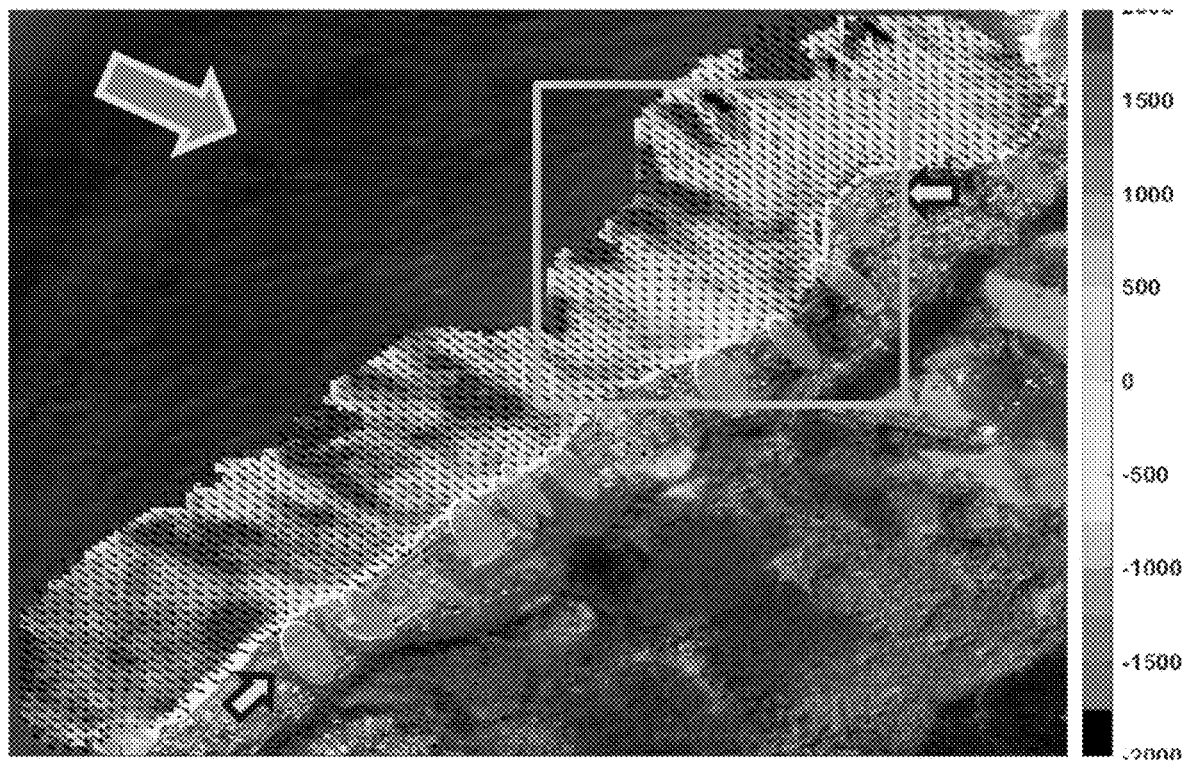

FIGURE 10
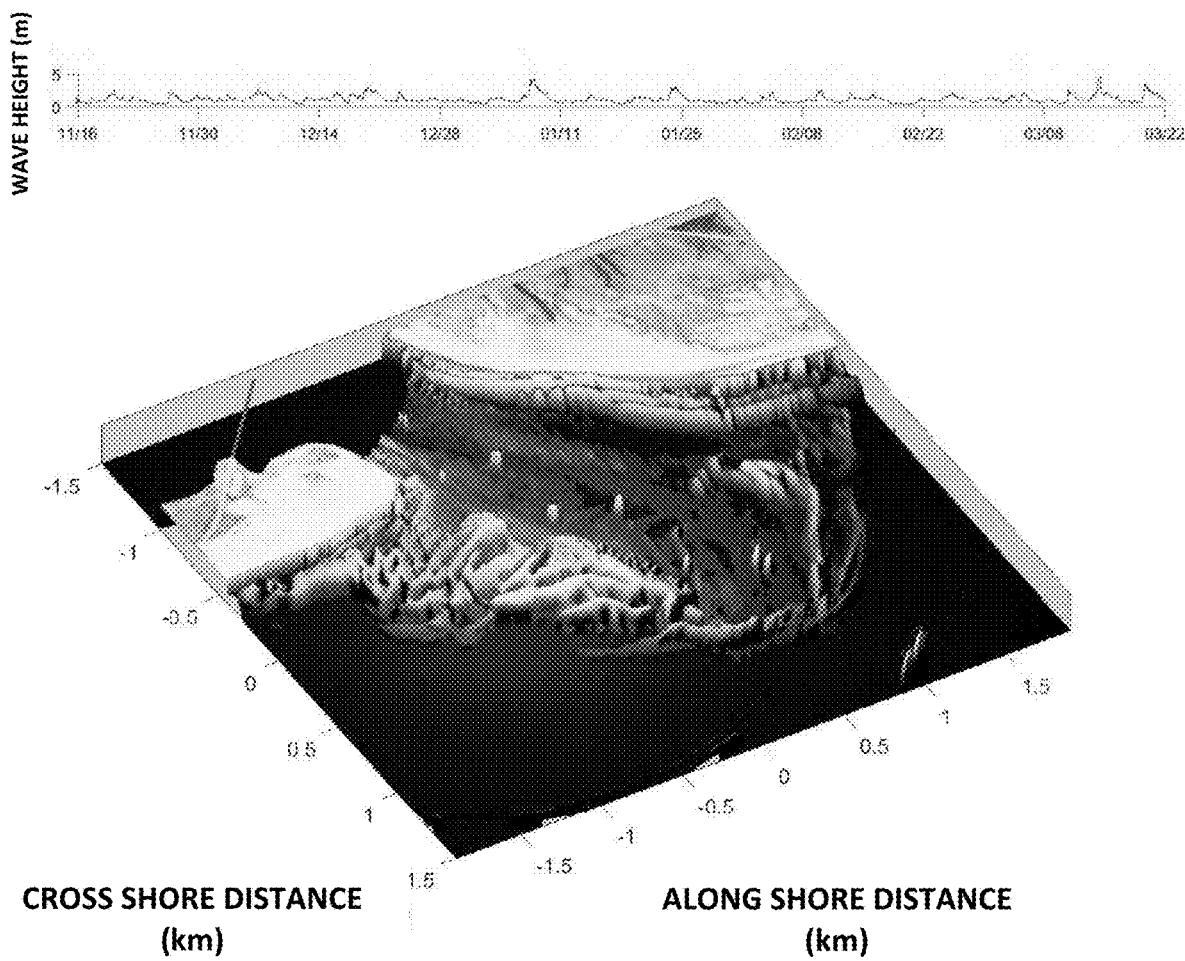
CROSS SHORE DISTANCE
(km)
ALONG SHORE DISTANCE
(km)

FIGURE 12
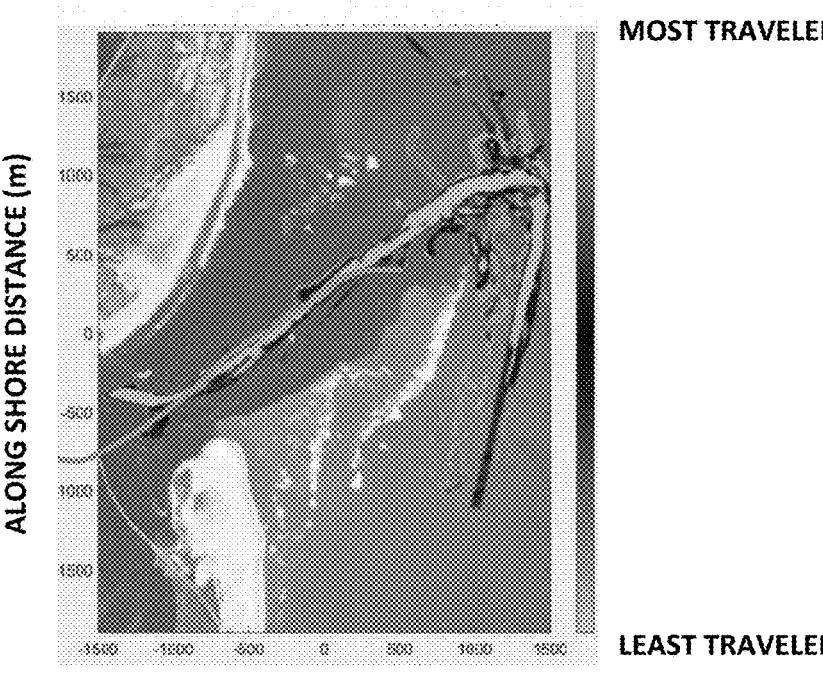
MOST TRAVELED
LEAST TRAVELED
CROSS-SHORE DISTANCE (m)
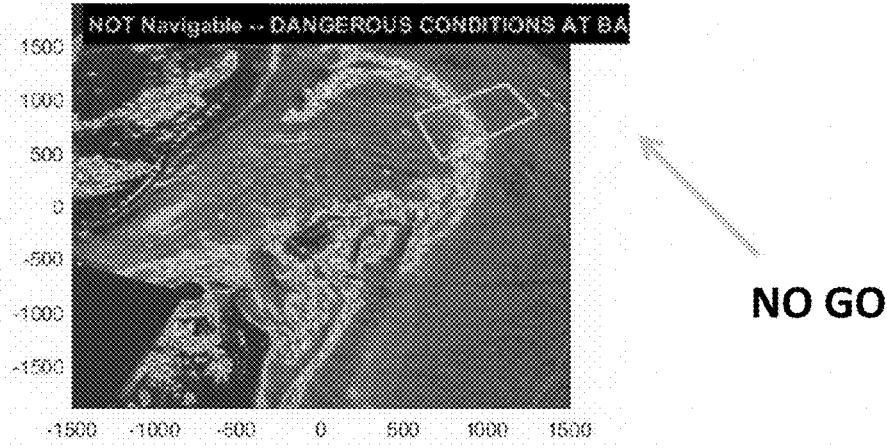
NO GO
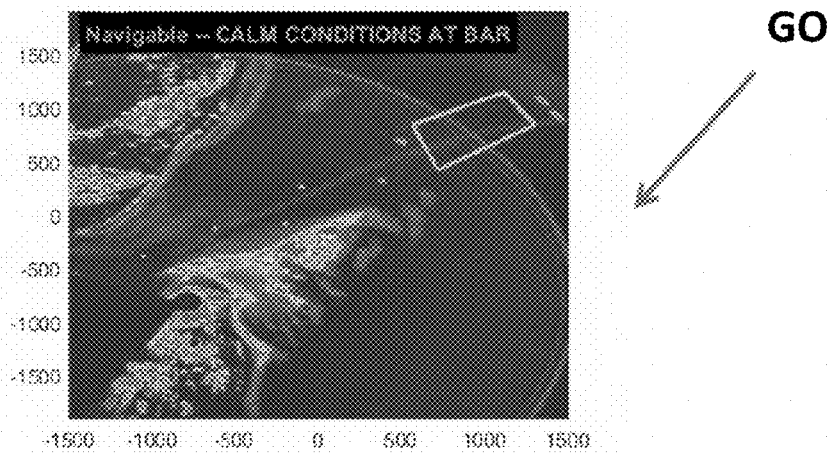
GO

FIGURE 13
AVERAGE WAVE DIRECTION (degrees True) OVER BATHYMETRY
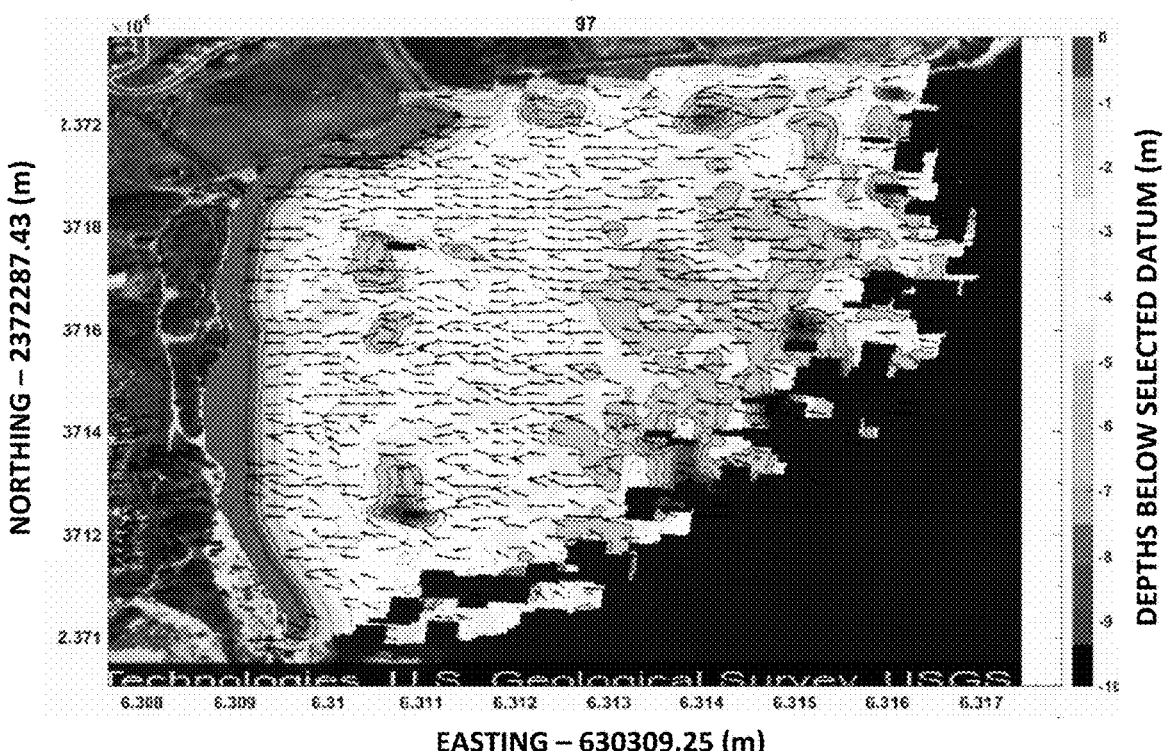
EASTING – 630309.25 (m)
SURFACE CURRENTS OVER BATHYMETRY
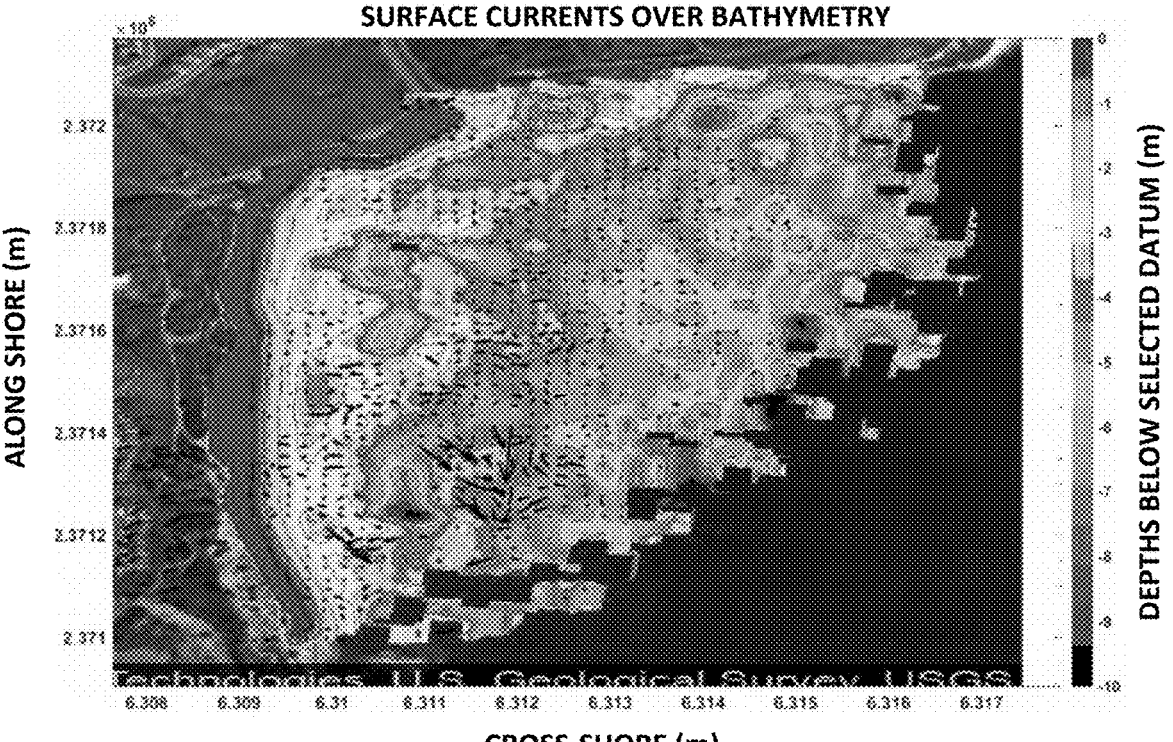
CROSS-SHORE (m)

FIGURE 14
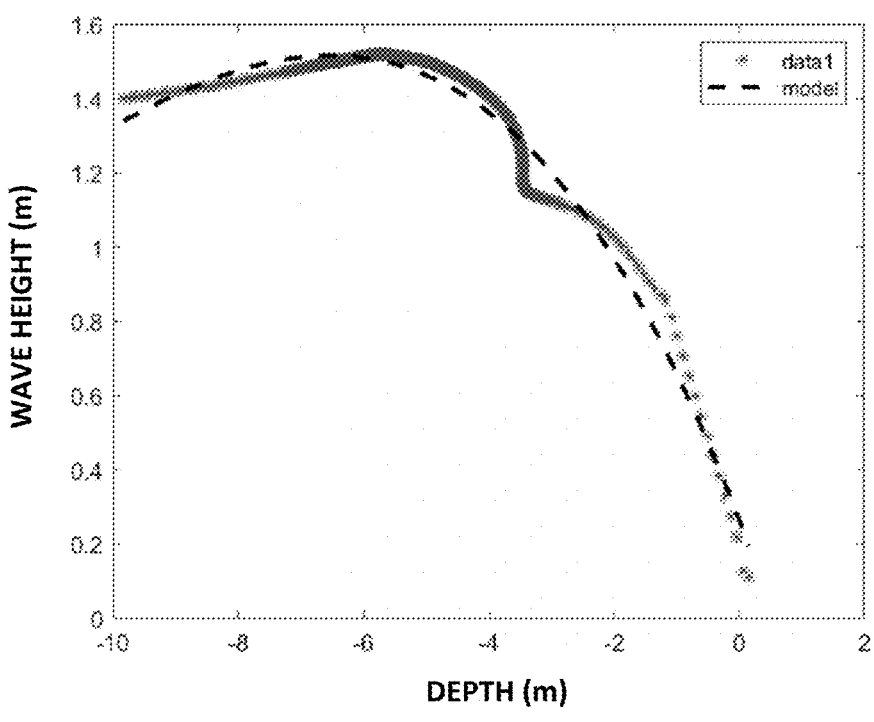
WAVE HEIGHT ACROSS SURF ZONE
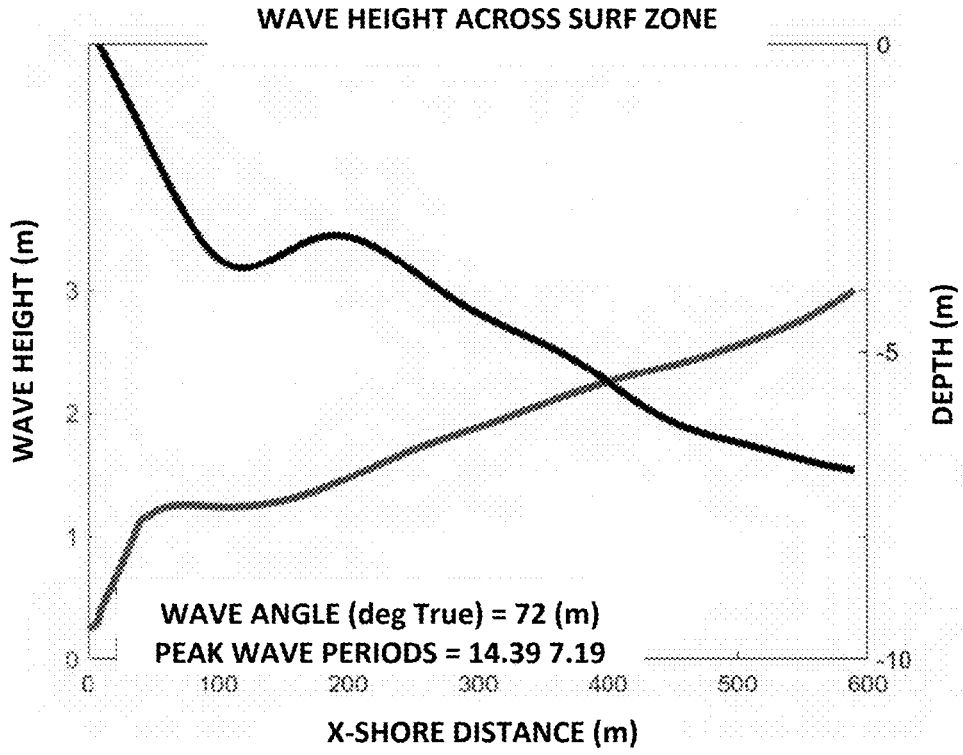

FIGURE 15
1 ROTATION = ~1.2s
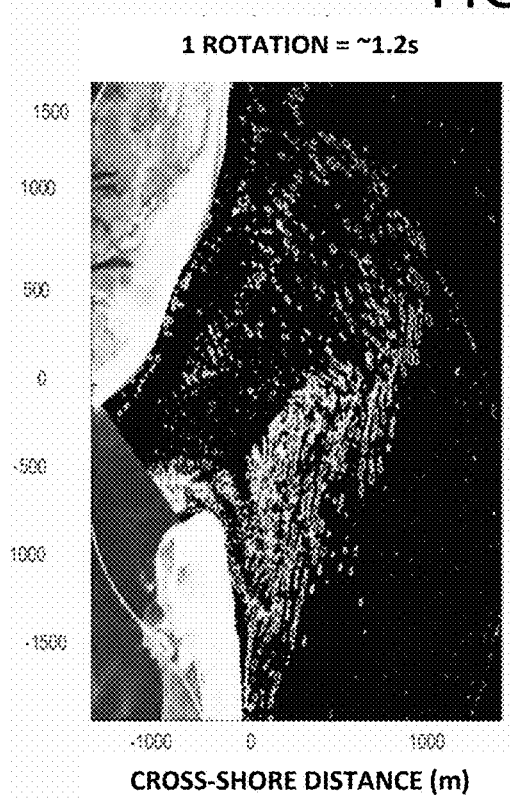
CROSS-SHORE DISTANCE (m)
1 COLLECT = 512 ROTATIONS = ~10 min
CROSS-SHORE DISTANCE (m)
25 COLLECTS = 25 HRS
CROSS-SHORE DISTANCE (m)

SYSTEM AND PROCESSES INVOLVING SUBMERGED HAZARD MAPPING

PRIORITY CLAIM

This application is a continuation of U.S. non-provisional patent application Ser. No. 17/991,833 filed Nov. 21, 2022, titled SYSTEM AND PROCESSES INVOLVING SUBMERGED HAZARD MAPPING, which application is a non-provisional patent application of U.S. provisional patent application 63/281,584 filed Nov. 19, 2021, titled SYSTEM AND PROCESSES INVOLVING SUBMERGED HAZARD MAPPING.

This application claims the benefit of and/or priority to each of the foregoing patent applications. The foregoing patent applications are incorporated by reference in their entirety as if fully set forth herein.

FIELD OF THE INVENTION

This disclosure relates generally to systems and processes involving hazard mapping.

BACKGROUND

This disclosure relates generally to systems and processes involving hazard mapping. There exists a need for high-resolution, real-time observations of waves, currents, and submerged hazards in shallow regions.

One problem in the art is that expensive surveys become obsolete in a short amount of time due to very dynamic sea conditions and depths. Another problem in the art is that it can be very challenging to make observations below the sea surface and deliver products in real-time. Surf-zones can be extremely dangerous to survey (e.g. harbor entrances, inlets, fishing shoals). Additionally, traditional surveying approaches, or most other remove sensing signals, do not work in breaking-wave environments and/or are expensive.

SUMMARY

Embodiments disclosed herein relate generally to systems and processes involving hazard mapping. In one embodiment, a system includes, but is not limited to, an IMU; a radar system; a GPS receiver; and at least one computer processor configured to perform operations including at least: obtaining motion data, radar data, and position data obtained using the IMU, the radar system, and the GPS receiver, respectively, co-registering the radar data, the position data, and the motion data in a cartesian 3D matrix, and determining at least one hazard involving geomorphology, surface current, wave, or bathymetry at least partly using the 3D matrix, and GIS-referencing the hazard to imagery for output.

BRIEF DESCRIPTION OF THE DRAWINGS

Embodiments are described in detail below with reference to the following drawings.

FIG. 2 is a technical process for hazard mapping, in accordance with an embodiment of the invention;

FIGS. 5-14 depict applications of the systems, devices, and methods described and illustrated herein, in accordance with embodiments of the invention;

FIG. 15 depicts radar samplings obtained using the systems, devices, and methods described and illustrated herein;

APPENDIX A, incorporated by reference as if fully set forth herein, provides additional technical system and process details, in accordance with various embodiments of the invention.

DETAILED DESCRIPTION

This disclosure relates generally to systems and processes involving hazard mapping. Certain embodiments are set forth in the following description and in FIGS. 1-26 and APPENDIX A to provide a thorough understanding of such embodiments.

In one embodiment, systems and processes disclosed herein exploit the sensitivity of X-band radar to roughened sea surface (waves, foam, ripples) to 'see' beneath the sea to provide and implement rapid hazard mapping (e.g., submerged). The embodiments disclosed herein are suitable for adverse conditions with inclement weather and low-visibility.

Figure 1:
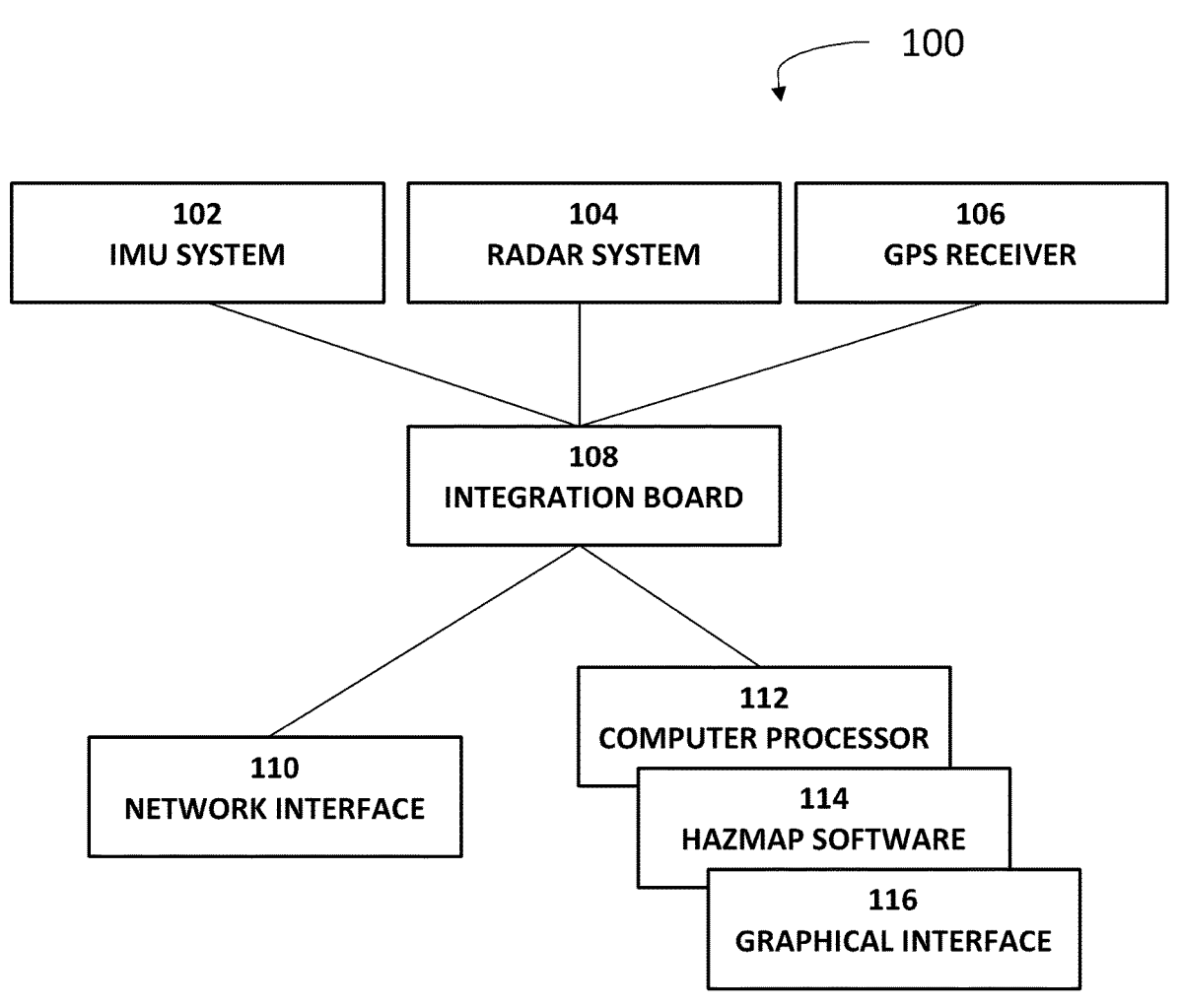
FIG. 1 is a system diagram for hazard mapping, in accordance with an embodiment of the invention.

FIG. 1 is a system diagram for hazard mapping, in accordance with an embodiment of the invention. In one embodiment, system 100 includes IMU system 102, radar system 104, GPS receiver 106, integration board 108, network interface 110, computer processor 112, hazard mapping software 114, and a graphical interface 116. System 100 implements technical process 200 and/or various embodiments disclosed and illustrated herein.

FIG. 2 is a technical process for hazard mapping, in accordance with an embodiment of the invention. In one embodiment, technical process 200 includes generating heading and pitch strings at 102, generating radar pulse strings at 204, generating time and position strings at 206, obtaining radar, motion, and position strings at 208, co-registering radar, position, and motion data in a cartesian 3D matrix at 210, determining a geomorphology, surface current, wave, bathymetry parameter or hazard at 212, GIS-referencing to topographical or bathymetry imagery at 214, and outputting to a user interface at 216. Technical process 200 is implemented using system 100 and/or various embodiments disclosed and illustrated herein.

Figure 3:
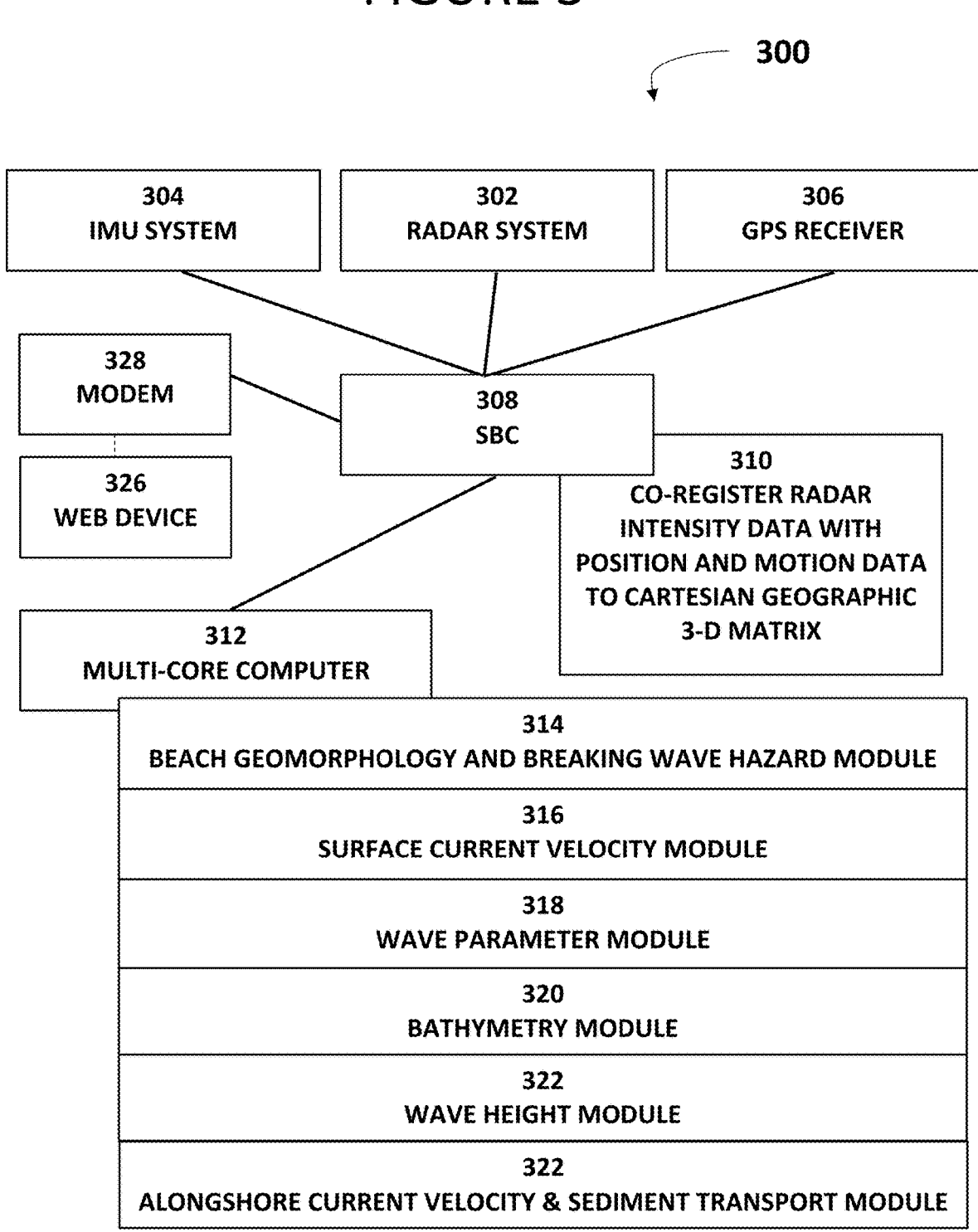
FIG. 3 is a component diagram of a system, in accordance with an embodiment of the invention.

FIG. 3 is a component diagram of a system, in accordance with an embodiment of the invention. In one embodiment, a Radome 302, IMU 304, and GPS 306 are linked to an SBC 308. The SBC 308 is linked to a multi-core computer 312 and a modem 328. The Radome 302 is a digital X-band radar generating 4096 range-intensity pulses per second with power and data through cat6. The IMU 304 generates heading and pitch strings through USB at 100 Hz. The GPS 306 generates time and position strings through USB at 10 Hz. In one embodiment, the system integrates with existing marine electronics, such as a GPS plotter. The SBC 308 is a single-board computer integrating radar, motion, and position strings. The multi-core computer 312 performs rapid oceanographic processing. The modem 328 communicates encrypted data. The web-browsing compatible device 326 is configured to communicate with the modem 328.

In certain embodiments, the SBC 308 simultaneously co-registers radar intensity data with position and motion data to a binary file that is a cartesian geographic 3D matrix. The multi-core computer 312 includes one or more modules. The beach geomorphology and breaking-wave hazard module 314 GIS-references to any underlying top/bathy chart and imagery. The surface current velocity module 316 GIS references to any underlying topo/bathy chart and imagery. The wave parameter module 318 provides measures of wave period, speed, and direction GIS referenced to any underlying typo/bathy chart and imagery. The bathymetry module 320 GIS references to any underlying top/bathy chart and imagery. The wave height module 322 GIS references to any underlying topo/bathy chart and imagery. The alongshore current velocity and sediment transport module GIS-references to any underlying topo/bathy chart and imagery.

Figure 4:
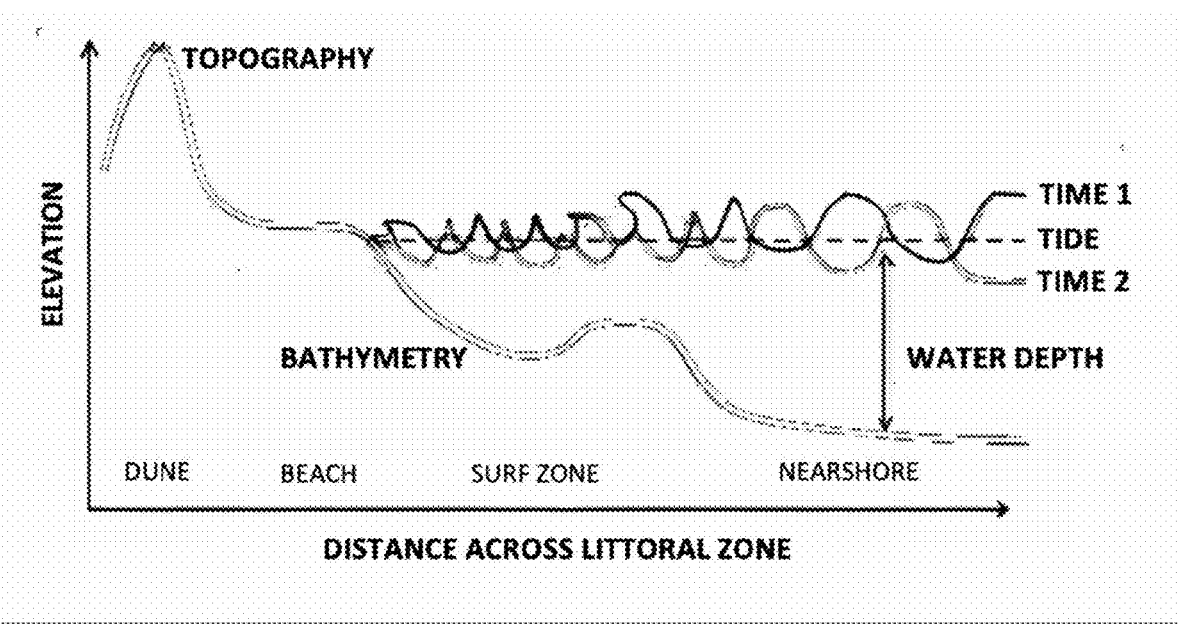
FIG. 4 provides a chart of wave speed and shape in shallow water relative to water depth, in accordance with embodiments of the invention.

FIG. 4 provides a chart of wave speed and shape in shallow water relative to water depth. X-band radar is positioned at a harbor entrance or on a beach and is applied to sample roughened sea surface (waves, foam, ripples) to 'see' beneath the sea.

In one embodiment, a motion sensor integrated with a digital X-band marine radar is operably coupled with a GPS receiver, computer, and/or power source. One or more program instructions configure the computer, the motion sensor, and/or the X-band marine radar to perform data collection, processing, and outputs, including creating a near-real-time 3D matrix of radar intensity and/or motion in cartesian space for a surface area relative to time.

In certain embodiments, the program instructions configure the computer, the motion sensor, and/or the X-band marine radar to generate a 3D matrix of radar intensity and/or motion, which is used to determine water surface attributes, such as sandbar morphology, currents, surface-water roughness, shoaling patterns, wave direction, wave angle, wave length, wave shape, wave height, wave speed, foam, and/or ripples in space and/or time.

Figure 5:
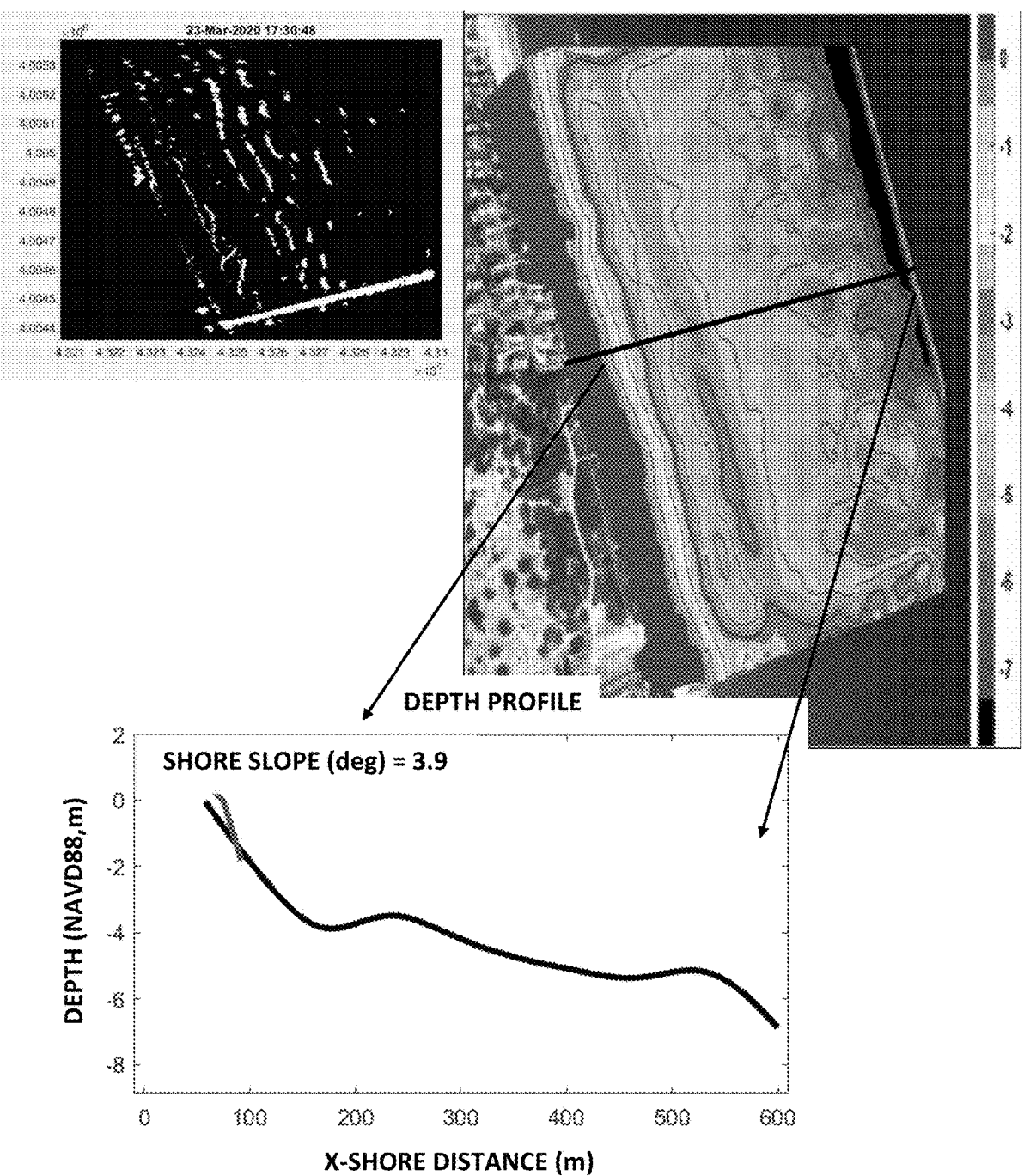

FIG. 5 depicts an application of the systems, devices, and methods described and illustrated herein, including providing a bathymetry solution from measured waves. A linear dispersion equation is solved across the spatial domain using measured wave speeds (e.g. motion and wave length).

FIG. 6 depicts an application of the systems, devices, and methods described and illustrated herein, including real-time route guidance determined using wave patterns. The route guidance provides a pathway around submerged hazards as in the example of Kaneohe Bay.

FIG. 7 depicts an application of the systems, devices, and methods described and illustrated herein, including surface current identification and rip current detection using indications of advecting foam. The surface currents and rip currents here are depicted relative to Sunset Beach, as an example.

Figure 8:
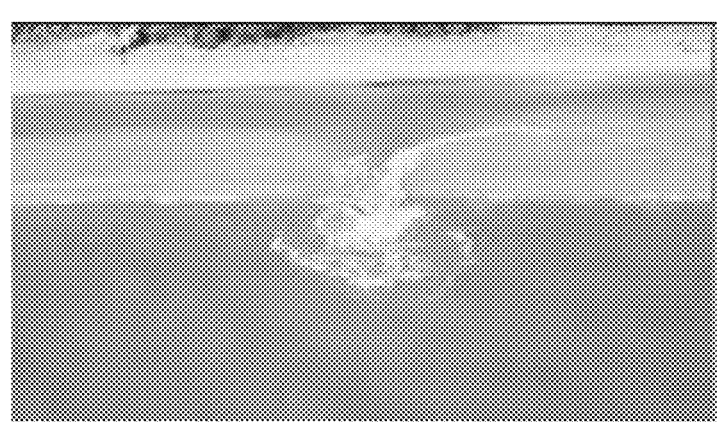

FIG. 8 depicts an application of the systems, devices, and methods described and illustrated herein, including rip current location forecasting from sandbar morphology. Depicted is a beach 802 including nearshore underwater sandbars 804 associated with rip tides 806. Rapid radarmapped beach and sandbar information is used to identify holes in underwater sandbar, as illustrated in the side view and top view.

FIG. 9 depicts an application of the systems, devices, and methods described and illustrated herein. The North Shore, Oahu and Sunset Beach are illustrated as an example with the classic westerly swell event of >4 m Hs swell from the WNW. Sediment transport beach erosion and accretion determinations are made based on converging and diverging regions of wave-driven force. The following equations were used where θ and E are derived from observation.

$$S_{xy} = E \frac{c_g}{c} \cos \theta \sin \theta$$

$$E = \frac{\rho g a^2}{2}$$

FIG. 10 depicts an application of the systems, devices, and methods described and illustrated herein, including a 3D time series of tidal delta sandbar movement.

Figure 11:
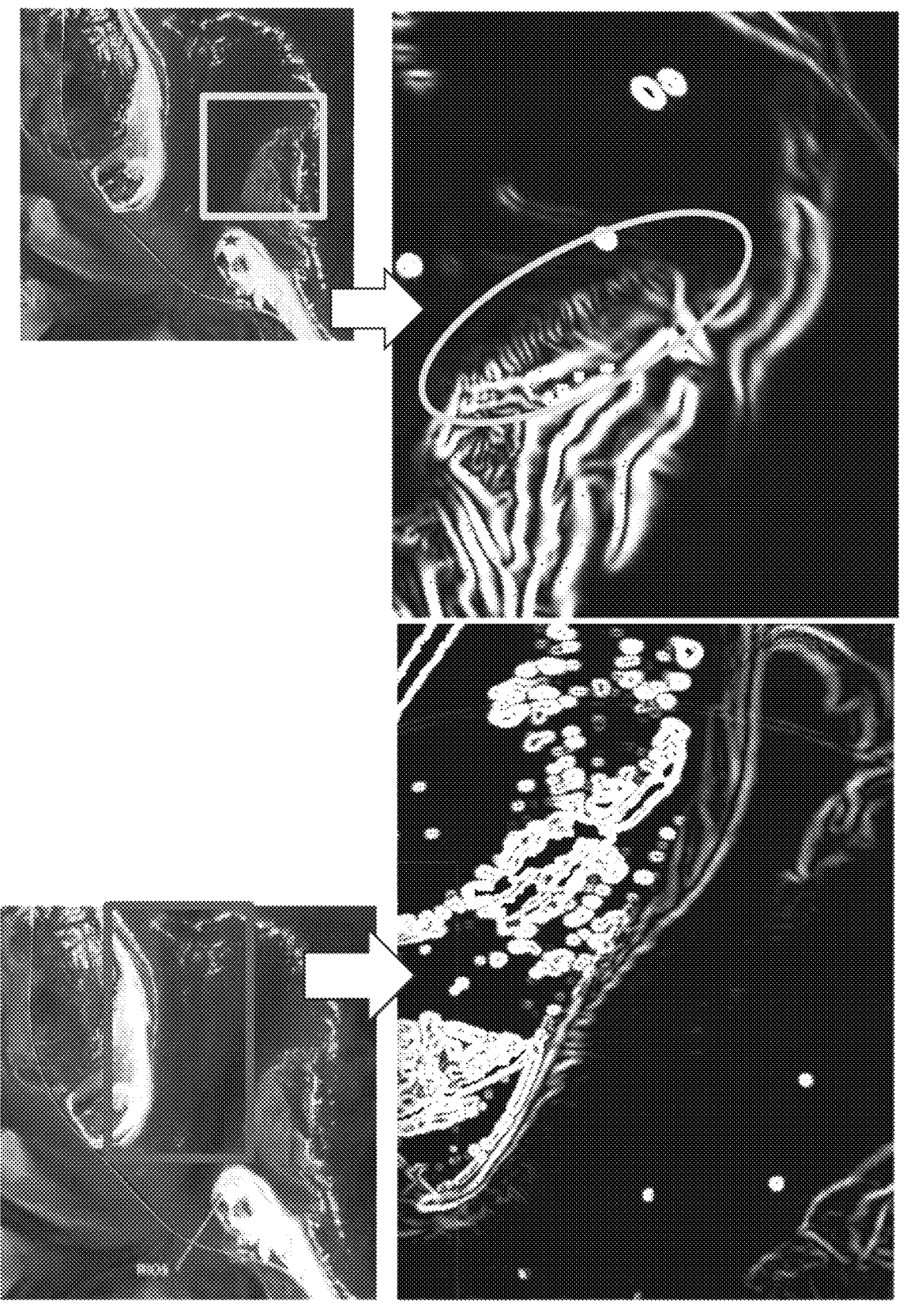
Figure 16:
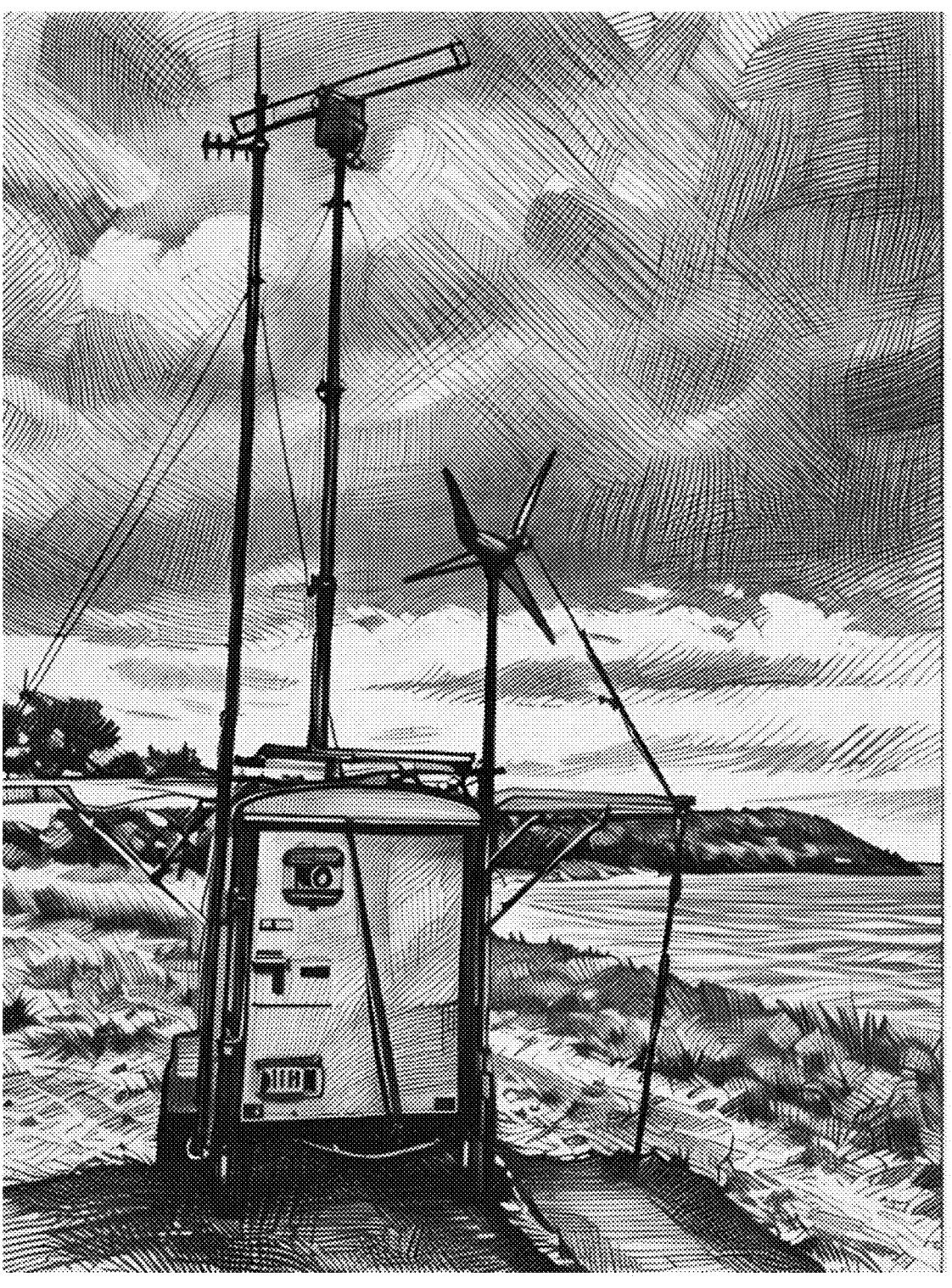
FIGS. 16-23 depicts various systems and devices, in accordance with embodiments of the invention.
Figure 17:
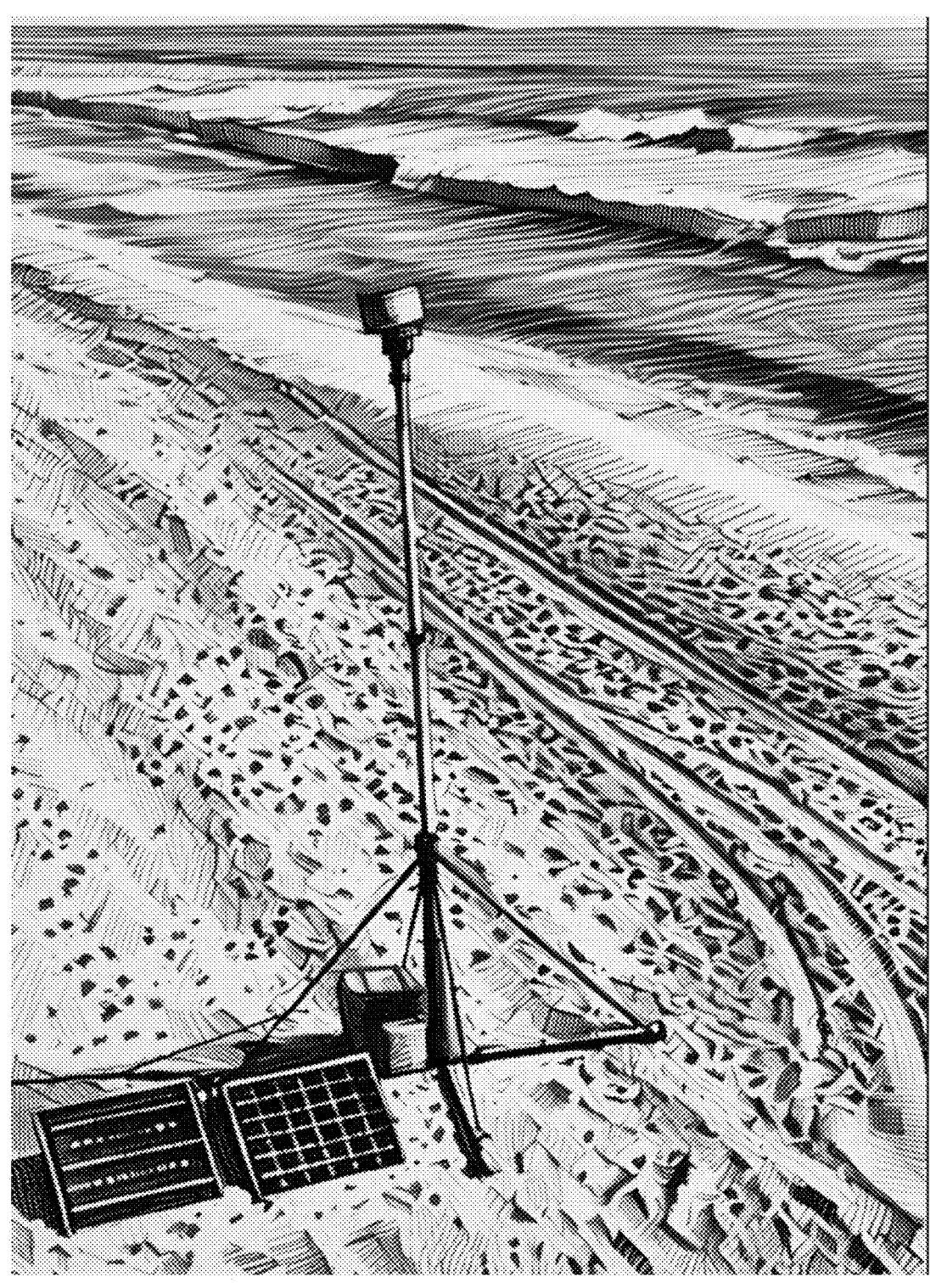
Figure 18:
Figure 19:
Figure 20:
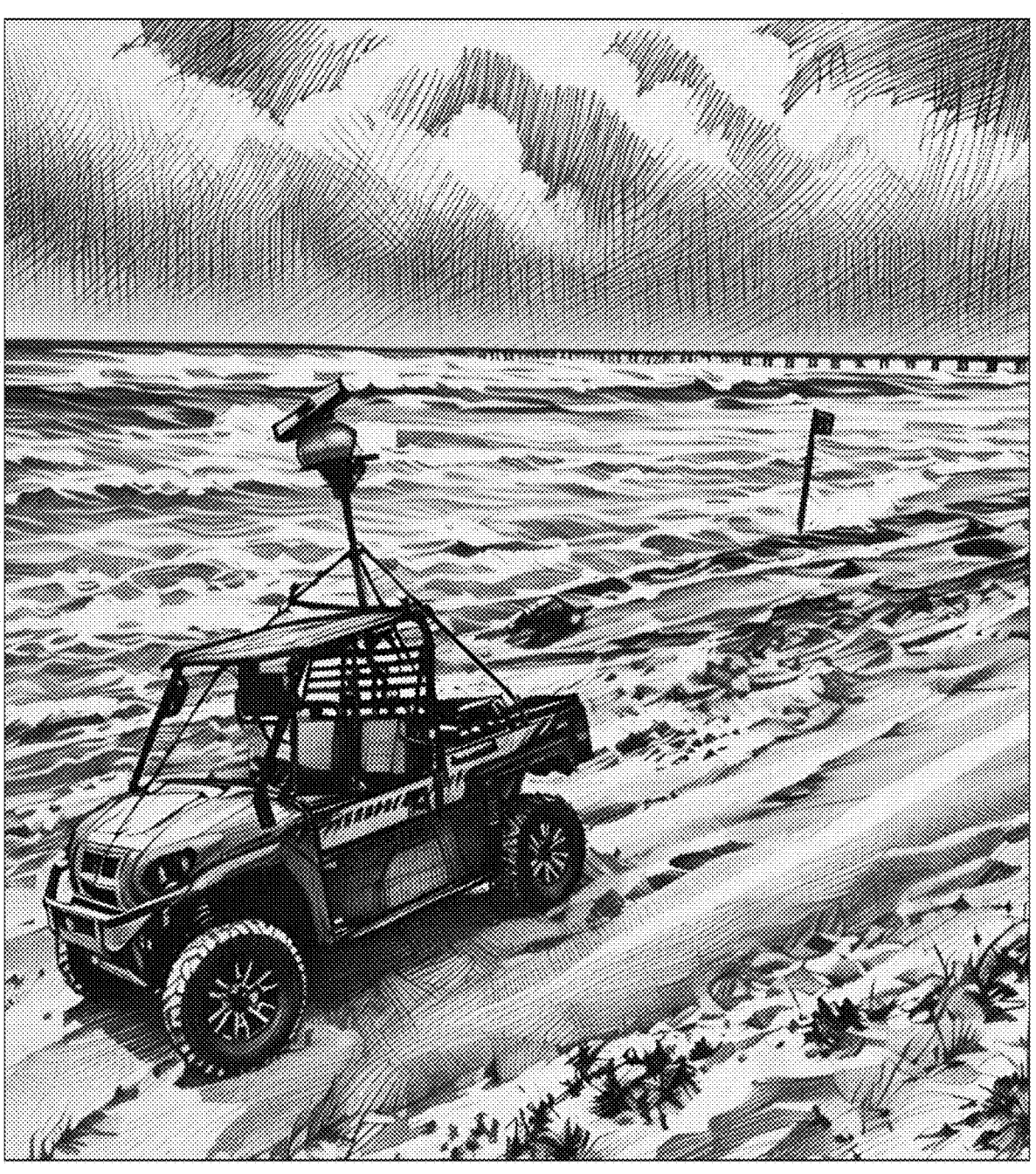
Figure 21:
Figure 22:
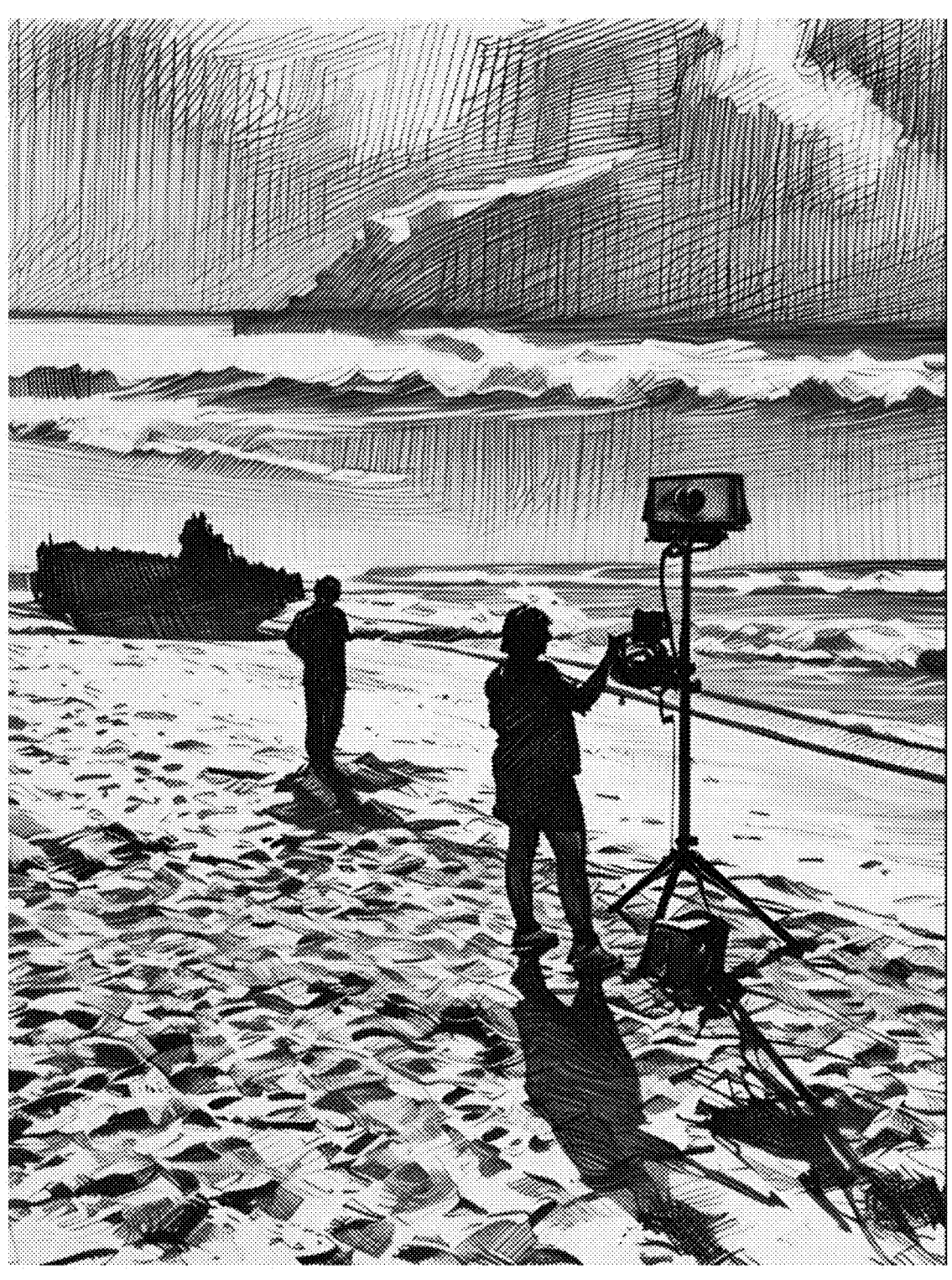
Figure 23:
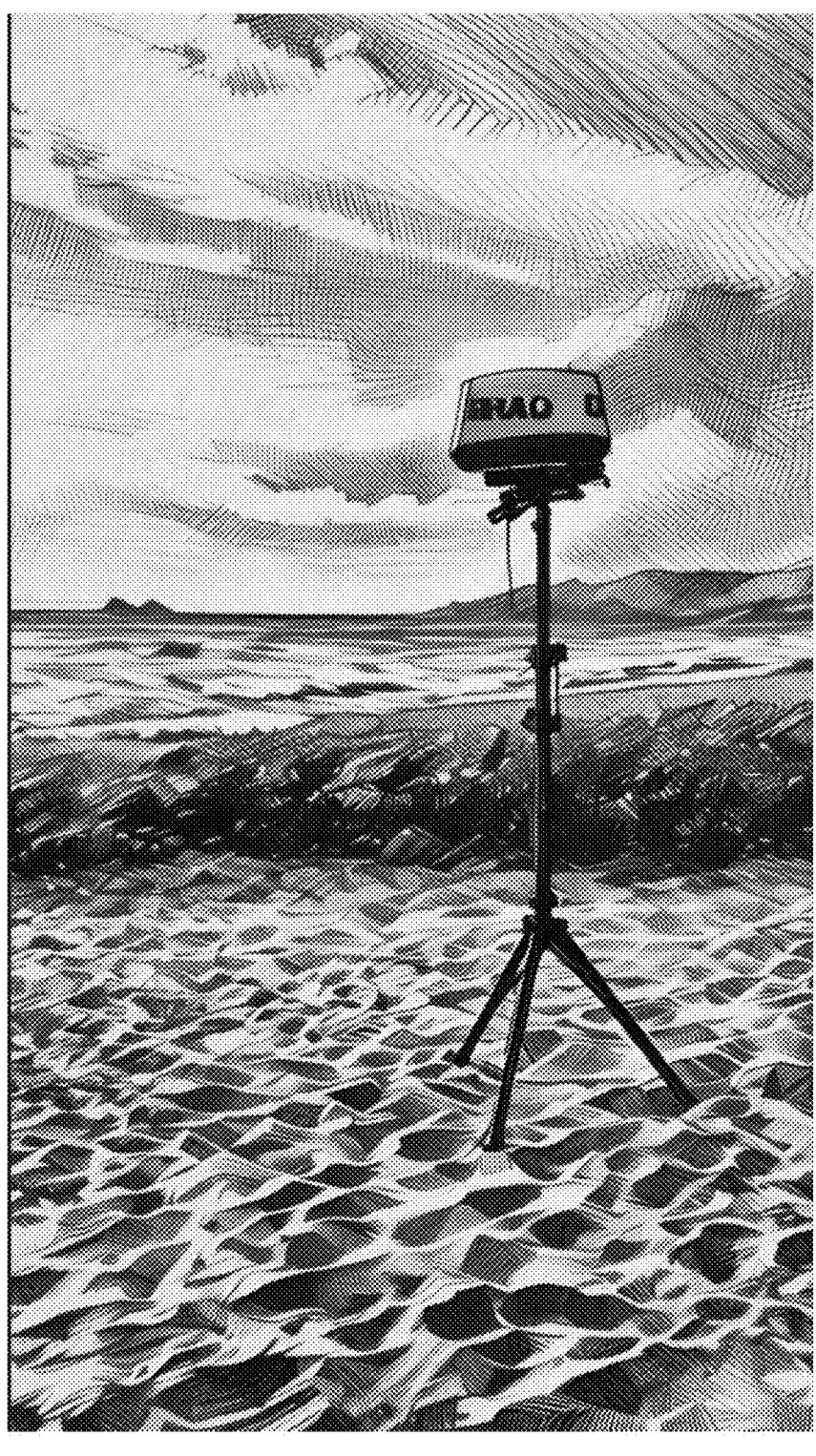

FIG. 11 depicts an application of the systems, devices, and methods described and illustrated herein, including channel and shoal position monitoring for improved channel maintenance. Sandbar migration is depicted from a period of November 16$^{th}$ through the 30th. The information of sandbar migration is used for targeted dredging and channel adjustment.

FIG. 12 depicts an application of the systems, devices, and methods described and illustrated herein, including real-time condition assessment at harbor entrances and route guidance. Real-time (e.g. hourly) assessments of wave conditions in a navigation channel are used to make a 'go' or 'no go' decision based on routes navigated by larger vessels over a prior period (e.g. 24 hrs).

FIG. 13 depicts an application of the systems, devices, and methods described and illustrated herein, including wave direction determinations from measured wave angle superimposed with depths and currents.

FIG. 14 depicts an application of the systems, devices, and methods described and illustrated herein, including wave height determinations across the nearshore, such as for navigation safety and sediment transport. The wave height solution uses B&J at a selected transect. The spline model is used to fit wave height and depth.

FIG. 15 depicts radar samplings obtained using the systems, devices, and methods described and illustrated herein, including radar sampling for one rotation over approximately 1.2 seconds, for 1 collection of 512 rotations over approximately 10 minutes, and for 25 collections of 512 rotations over approximately 25 hours.

In one particular embodiment, the computer uses the 3D matrix to identify underwater rip current features. Specifically, the 3D matrix is used to determine surface sandbar morphology, wave attributes, surface aspects, and/or currents, which information is then used to map subsurface rip current locations and/or intensities. In one particular embodiment, the computer communicates the subsurface rip current locations and/or intensities via one or more networks to generate notifications and/or controls, such as via one or more databases, smart phone applications, or websites. For instance, one or more smart devices located proximate to the rip current locations are automatically notified of the rip current location, intensity, and/or risk. Additionally, devices of first responders, rescuers, and/or lifeguards associated with the rip current locations are automatically alerted of the rip current location, intensity, and/or risk information to support awareness and/or focused patrols. In an additional embodiment, one or more drones are controlled automatically or semi-automatically for dispatch and/or surveillance of the rip current locations.

In another embodiment, the computer uses the 3D matrix to map floating subaquatic vegetation and/or forecast beach impact. Specifically, the 3D matrix is used to determine gradients in surface-water aspects such as roughness, which information is then used to map floating subaquatic vegetation (SAV) and/or forecast the beach impact of the SAV. Through repeated mapping from a mobile platform or near-continuous mapping from a fixed shore-based location, the velocity (direction & speed) of floating SAV can be measured. These SAV velocity measurements, combined with local observations of regional winds and surface currents, can then be used to forecast the likely location of floating SAV for 3-5 days. Forecasts of several days provide most stakeholders adequate time to respond with necessary equipment (e.g. floating booms, beach grooming tractors) to protect valuable infrastructure.

In a further embodiment, the computer uses the 3D matrix to optimize harbor, marina, inlet, and/or fishing ground ingress and/or egress. Specifically, the 3D matrix is used to map wave shoaling patterns, which information is then used to identify submerged hazards and optimize and/or control vessel routing and/or timing. In one particular embodiment, the computer communicates the vessel routing as one or more GPS coordinates with timing window constraints via one or more networks to generate notifications and/or controls, such as via one or more databases, smart phone applications, navigational systems, or websites. For instance, one or more smart devices located proximate to a particular ingress and/or egress location are automatically notified of the vessel routing for ingress and/or egress and any timing constraints. Optionally, one or more automated vessel reporting systems can be updated with a computer generated speech or text output that details the recommended vessel routing and/or timing constraints for a particular location. In one particular embodiment, the GPS autopilot system of affected vessels is automatically updated and/or programmed using the recommended routing and/or timing constraints to adjust heading and/or speed of a vessel for conformance to the safe ingress/egress route at the time window.

FIGS. 16-23 depict various systems and devices, in accordance with embodiments of the invention. In one embodiment, a system is configured for continuous long-term radar sampling, including, for instance, automated hourly monitoring of harbor entrances, beach areas, and ice conditions. The system includes a tower and a hardware container as depicted. In one particular embodiment, the system is configured for static, autonomous X-band radar with a range of approximately 2 kilometers, with a horizontal resolution of less than approximately 2 meters, with an approximately 0.85 Hz sampling rate, and with a collection duration of approximately 8 minutes. In another embodiment, a mobile system is configured for providing rapid surf zone metrics. Multiple configurations are provided, including mobile or static systems and including short (e.g. approximately 1 km) or long range (e.g., approximately 3 km) options. In one particular embodiment, the system is configured for mobile, low-power X-band radar with a range of approximately 900 m, with a horizontal resolution of less than approximately 1 m, with a sampling rate of approximately 0.85 Hz, and with a collection time of approximately 6 minutes. In certain embodiments, the system is configured for portable mounting options for ATVs or AAVs.

Figure 24:
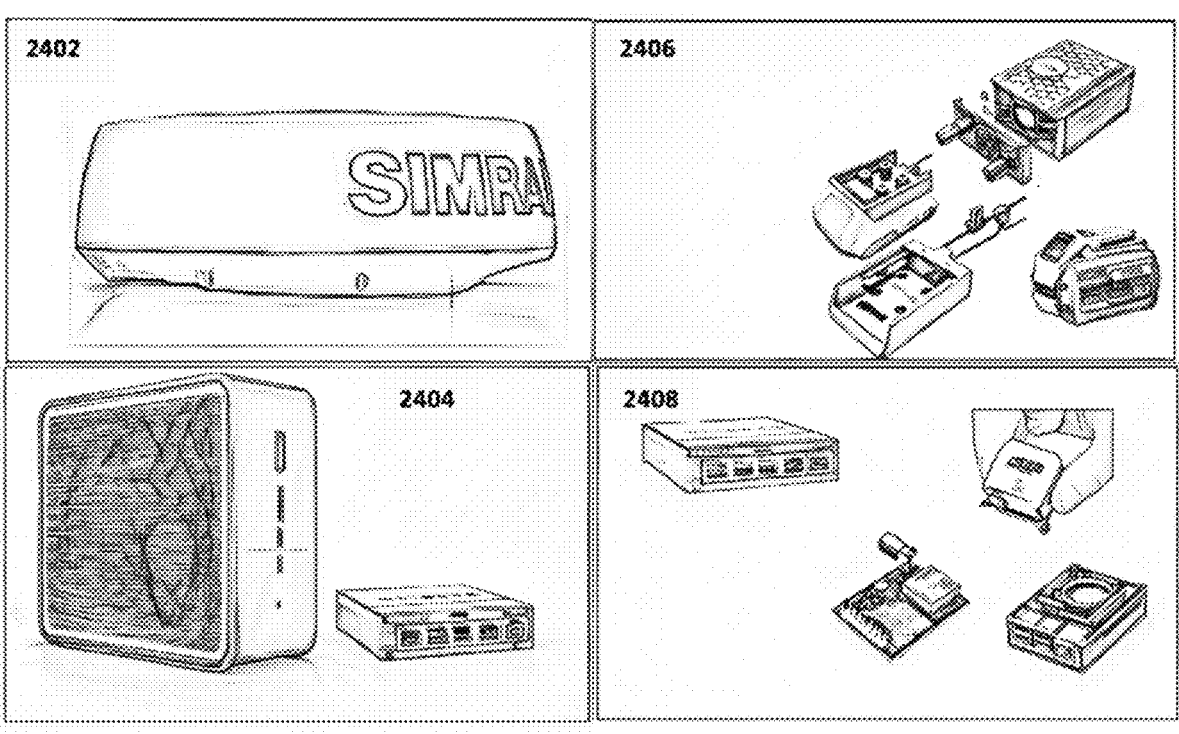
FIG. 24 is a system, in accordance with an embodiment of the invention.

FIG. 24 is a system, in accordance with an embodiment of the invention. In one embodiment, the system includes a SIMRAD radar device 2402 and a PC 2404 approximately 16×10×4 inches in size and weighing approximately 2.5 lbs. The PC 2404 (e.g., NUC9) includes exterior ports (e.g., cat6) and a modem. In a further embodiment, the system includes a power box 2406 approximately 5-8 inches×4-6 inches×4 inches and weighing approximately 5 lbs. The power box 2406 includes a Lithium (e.g., DCB609Y) 20V battery and an inverter or similar modulator. In another embodiment, the system includes a Pi or equivalent controller 2408 of approximately 10×8×4 inches and weighing approximately 1.5 lbs. The Pi box 2408 includes exterior ports (e.g., cat6), a Raspberry Pi or similar controller, a modem, an SBG IMU, and a GPS.

Figure 25:
FIG. 25 is an arrangement of a system, in accordance with an embodiment of the invention.

FIG. 25 is an arrangement of a system, in accordance with an embodiment of the invention. In one embodiment, the system includes a plug-and-play antenna and hardened PC within a hand-held case. The hardware is contained within a single compartmentalized case. The depicted hardware is not to scale and specific brands are only examples; individual hardware components have multiple vendor sources.

Figure 26:
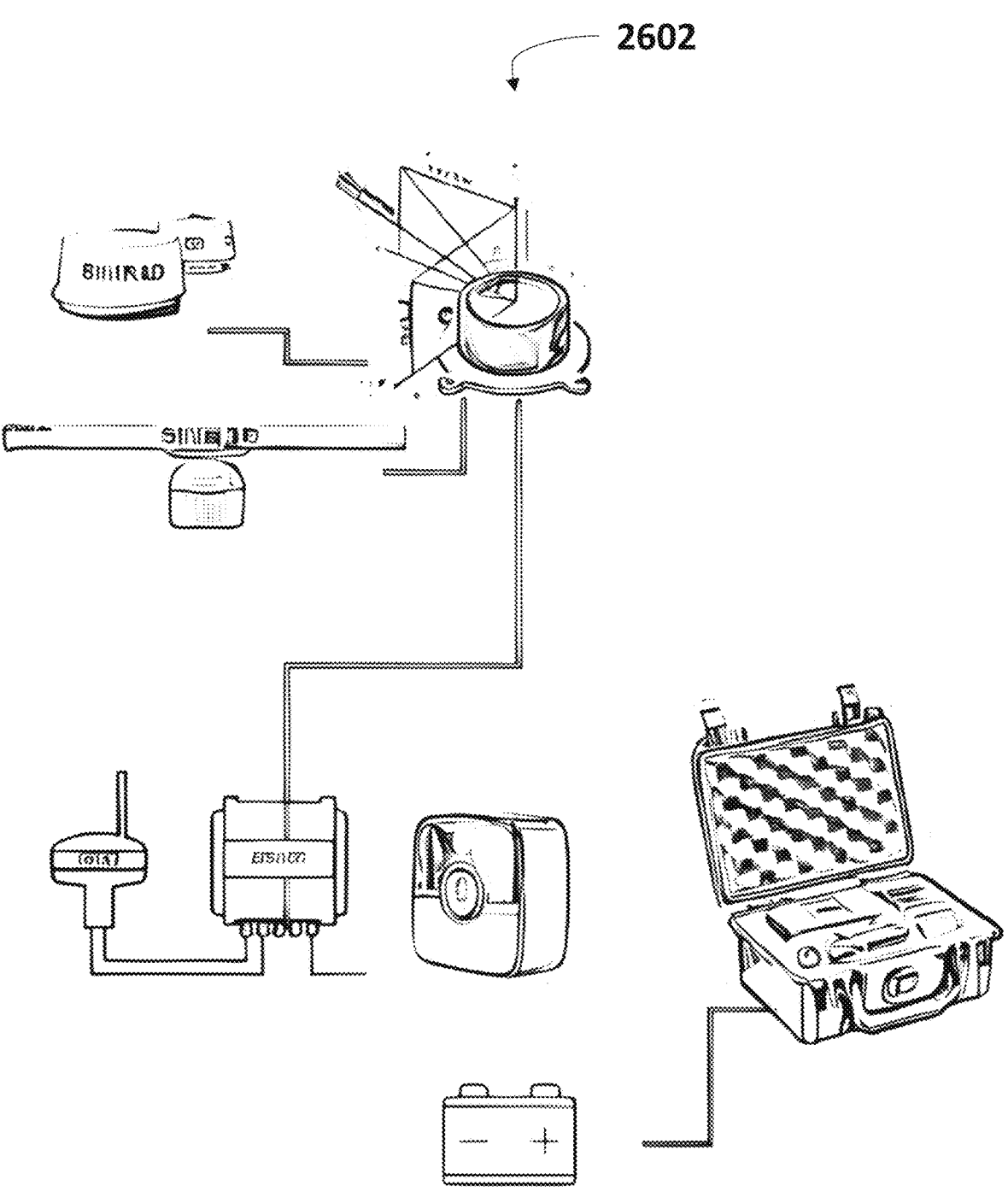
FIG. 26 is a system, in accordance with an embodiment of the invention.

FIG. 26 is a system, in accordance with an embodiment of the invention. In one embodiment, a rapid, submerged hazard mapping radar system 2600 includes, but is not limited to, the following hardware components 2602: a motion sensor integrated with digital. X-band marine radar; and a GPS receiver, a PC, and signal integration board contained within a ruggedized carrying case. An internal or external DC power source is optional. The rapid, submerged hazard mapping radar system 2600 includes, but is not limited to, the following software components 2604: one master GUI for hardware-software communication and software that facilitates data collection, facilitates data processing, creates a 3D matrix of radar intensity in cartesian space and time, and generates final products. For example, the software forecasts rip current locations by exploiting sandbar morphology, wave direction, and currents to map rip location. The software forecasts SAV beach impact by exploiting gradients in surface-water roughness to map floating subaquatic vegetation. The software optimizes ingress and egress routes by exploiting wave shoaling patterns to identify submerged hazards.

Figure 27:
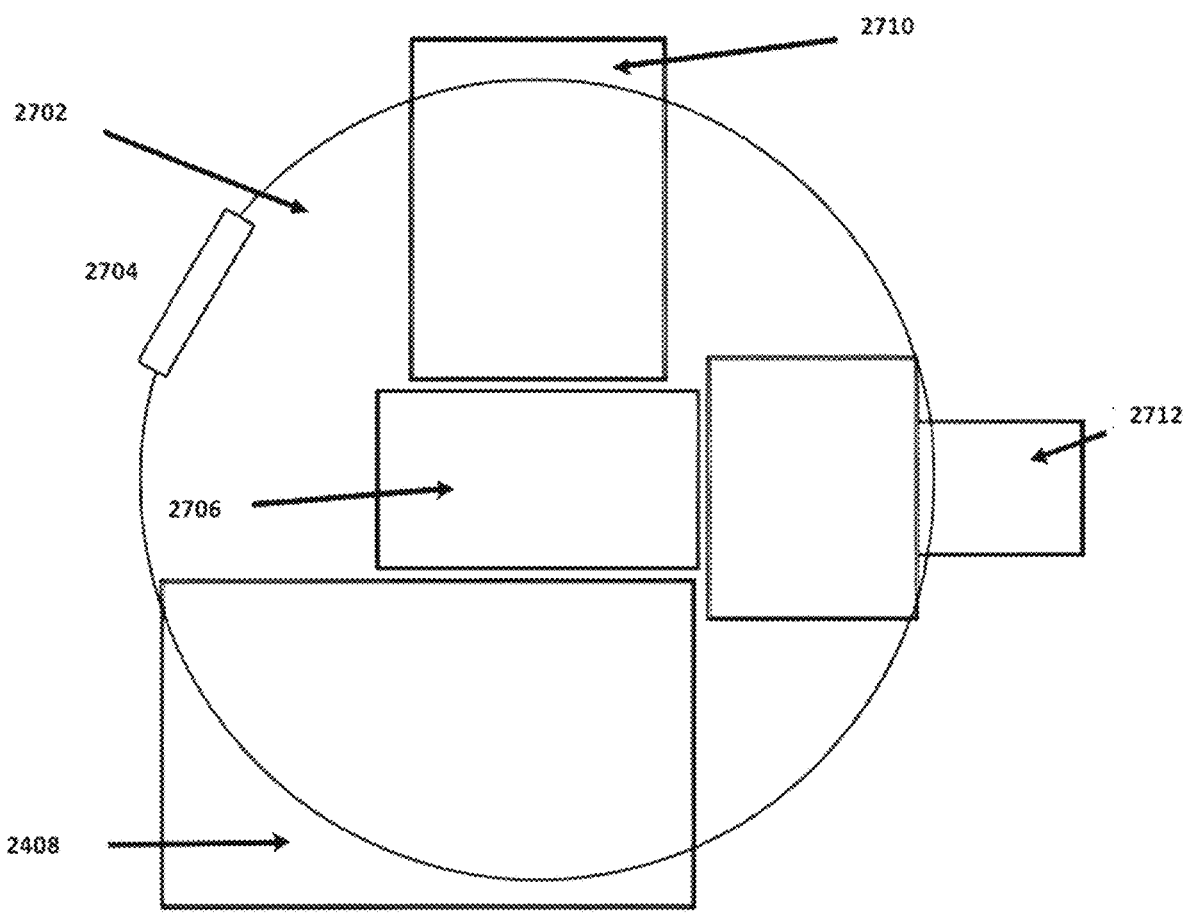
FIG. 27 is a top plan view of a system, in accordance with an embodiment of the invention.
Figure 28:
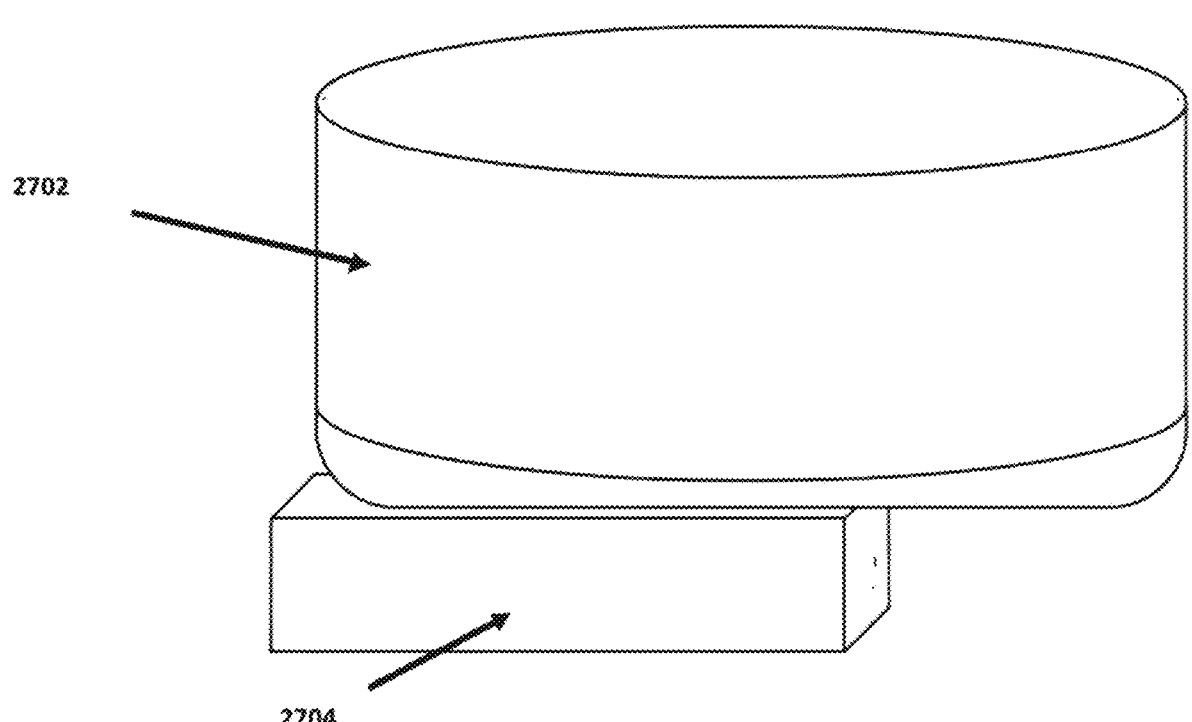
FIG. 28 is a side view of a system, in accordance with an embodiment of the invention.

FIG. 27 is a top plan view of a system, in accordance with an embodiment of the invention. FIG. 28 is a side view of a system, in accordance with an embodiment of the invention. In one embodiment, the system includes a Radome antenna 2702 and an antenna mounting base 2706. The system further includes a PC interior compartment space 2708, an ancillary device compartment (not visible), and a power compartment (not visible). In one embodiment, the system includes a Radome antenna 2702 with a carrying hole 2704 and an antenna mounting base 2706. The system further includes a PC interior compartment space 2708, an ancillary device compartment 2710, and a power compartment 2712. In one particular embodiment, the Radome antenna 2702 is approximately 24×9 inches and approximately 15 lbs. The carrying hole 2704 is provided in a base plate. The antenna mounting base 2706 is approximately 9.2×5.6 inches and includes a plate with a female pole slot. The PC interior compartment 2708 includes exterior ports (e.g., cat6), an PC (e.g., NUC9), and a modem and is approximately 16×10×4 inches with a weight of approximately 2.5 lbs. The ancillary device compartment 2710 includes interior ports (e.g., cat6), a processor (e.g., Raspberry Pi), a modem, and SBG IMU or equivalent, and a GPS and is approximately 10×8×4 inches and weighing approximately 1.5 lbs. The power compartment 2712 includes 2 interior ports, a Lithium 20V battery (e.g., DCB609Y), and an inverter or similar modulator. The power compartment 2712 is approximately 5-8×4-6×4 inches and weighs approximately 5 lbs. The total space footprint of the system is approximately 28×27×14 inches with a weight of approximately 28 lbs. All hardware is integrated in one carrying component except, optionally, for the wireless user-interface control. All hardware is encased with non-metallic, waterproof cases with no exposed cabling.

In a further embodiment, a field-operational radar system is provided (e.g., Android Tactical Awareness Kit—Expeditionary Radar (ATAKER)). The system is designed to interface with the Android Team Awareness Kit currently used by US forces (or other compatible devices), such that all required user interfaces and GIS-products occur through the Android (or any iOS device) and can seamlessly display with other tactical layers. This means that the radar and ancillary devices, plus data collection and processing, are all executed through one or more compiled software system that is controlled with a simple GUI on the Android. Furthermore, the hardware has been reduced such all components from power to computers to ancillary devices may be contained within a single waterproof and hardened case that is attached directly below the radar antenna. The system weighs less than 30 lbs, is waterproof and can be carried through the surf, and operates continuously for >10 hrs on a single battery (e.g., lithium battery). The collection and processing code has been optimized to generate final results within 10 minutes from the commencement of operation.

In certain embodiments, the following the system and process include observing the water surface (e.g. ripples, waves, foam, floating debris) with X-band radar to measure depths, identify submerged hazards, and estimate oceanographic conditions (e.g. rip currents, sediment transport). The system includes the Android Tactical Awareness Kit-Expeditionary Radar (ATAKER), which is designed to seamlessly interface with equipment currently used by US military forces and to provide tactical awareness information relevant to expeditionary missions.

Specific invention attributes for ATAKER include, but are not limited to, a single, wireless user interface that controls operations from hardware control to visualizing the final products. Any web-browsing compatible device may be used (e.g. iPhone, Android, PC tablets). ATAKER is currently configured with an Android 7, the civilian version of what the US military uses (Android Team Awareness Kit). Hardware control, including ancillary devices-GPS, IMU, Router/Modem—and the radar antenna are operated through compiled software which eliminates the need for multiple 3rd-party software. The hardware-software interfacing further optimizes ATAKER by providing real-time and continual calibration and quality control checks, and significantly reduces the time required to commence operations. ATAKER components are contained within a single, waterproof and hardened case that weighs less than 13 kg and has a space footprint of 68×68×35 cm. ATAKER may be easily carried by one person and can withstand the rigors of conveyance from a submerged submarine, swimming through the surf zone, and low-altitude jumps from helicopters. Power demand has been reduced such that ATAKER can be operated continuously for >10 hrs on a single lithium battery. ATAKER is compatible with multiple vendor, over-the-counter lithium batteries.

In one embodiment, the system operates whereby X-band radar data is collected and polar transformed into a cartesian matrix simultaneously with every antenna rotation which greatly reduces required processing time. The system does not require reliance on prior methodologies that required more time and more RAM requirements. These prior methodologies included first creating a binary file of radar intensity, range, and azimuth followed by separate mathematical exercise to polar transform into a large cartesian matrix.

In further embodiments, the ATAKER data products include-bathymetry, breaking wave hazards, shoreline position, beach width, wave height, wave speed, wave period, wavelength, surface current velocity, wave direction, and alongshore current velocity, which are individually or collectively automatically generated and layered onto an underlying GIS template image. The current ATAKER radar antenna configuration can use a 24-inch radome thereby providing a range of 1 km and yielding a data field that spans 2 km at 1-2 m grid node spacing.

What is claimed is:

1. A mobile system for rapid marine submerged hazard mapping, the mobile system comprising:
   a rotating radar antenna;
   an IMU;
   a GPS receiver; and
   at least one computer processor configured to perform operations including at least:
      obtaining motion data, radar data, and position data using the IMU, the radar antenna, and the GPS receiver, respectively;
   co-registering the radar data, the position data, and the motion data in a cartesian 3D matrix simultaneously with each rotation of the radar antenna;
   determining a submerged hazard based on a wave shoaling pattern identified using the cartesian 3D matrix; and
   GIS-referencing the submerged hazard.

2. The mobile system of claim 1, further comprising:
   a waterproof enclosure case including a female pole slot for removably coupling to the radar antenna for plug-and-play operation.

3. The mobile system of claim 1, wherein the at least one computer processor is further configured to perform an operation comprising:
   identifying a wave shoaling pattern including at least wave angle information.

4. The mobile system of claim 1, wherein the at least one computer processor is further configured to perform an operation comprising:
   obtaining water surface information using the radar data.

5. The mobile system of claim 1, wherein the at least one computer processor is further configured to perform an operation comprising:
   determining at least a depth profile of one or more submerged sandbars.

6. The mobile system of claim 1, wherein the at least one computer processor is further configured to perform an operation comprising:
   determining at least a 3D depth profile for the submerged hazard.

7. The mobile system of claim 1, wherein the at least one computer processor is further configured to perform an operation comprising:
   providing real-time route guidance including a navigation pathway around the submerged hazard.

8. The mobile system of claim 1, wherein the at least one computer processor is further configured to perform an operation comprising:

communicating vessel routing to a marine navigation system to avoid the submerged hazard, the vessel routing including one or more GPS coordinates and at least one timing window constraint.

9. The mobile system of claim 1, wherein the at least one computer processor is further configured to perform an operation comprising:

tracking the submerged hazard for migration over time.

10. The mobile system of claim 1, wherein the at least one computer processor is configured to perform an operation comprising:

mapping a submerged sandbar.

11. The mobile system of claim 1, wherein the at least one computer processor is configured to perform an operation comprising:

mapping a 3D time series of tidal delta sandbar movement.

12. The mobile system of claim 1, wherein the at least one computer processor is configured to perform an operation comprising:

mapping a rip current location and intensity based on the submerged hazard.

13. The mobile system of claim 1, wherein the at least one computer processor is further configured to perform an operation comprising:

polar transforming the radar data into a cartesian matrix simultaneously with each rotation of the radar antenna.

14. The mobile system of claim 1, wherein the at least one computer processor is further configured to perform an operation comprising:

polar transforming the radar data to cartesian format and co-registering the radar data, the position data, and the motion data in the cartesian 3D matrix with each rotation for a collection of rotations of the radar antenna.

15. The mobile system of claim 1, wherein the at least one computer processor is further configured to perform an operation comprising:

co-registering the radar data, the position data, and the motion data in the cartesian 3D matrix simultaneously with each rotation of the radar antenna over a collection of rotations to iteratively refine the cartesian 3D matrix.

16. The mobile system of claim 1, wherein the at least one computer processor is further configured to perform an operation comprising:

co-registering the radar data, the position data, and the motion data in the cartesian 3D matrix simultaneously with each rotation of the radar antenna without polar radar data to reduce processing time.

17. The mobile system of claim 1, wherein the at least one computer processor is further configured to perform an operation comprising:

co-registering the radar data, the position data, and the motion data in the cartesian 3D matrix simultaneously with each rotation of the radar antenna without polar radar data to reduce memory usage.

18. The mobile system of claim 1, wherein the IMU is configured to obtain motion data of heading.

19. The mobile system of claim 1, wherein the IMU is configured to obtain motion data of pitch.

20. A process for rapid marine submerged hazard mapping using a rotating radar antenna, the process comprising:

obtaining radar data using the radar antenna, the radar data including radar intensity along at least one transect of a marine area;

polar transforming the radar data to a cartesian 3D matrix in real-time with every rotation of the radar antenna;

identifying a wave shoaling pattern using the cartesian 3D matrix;

determining a submerged hazard based on the wave shoaling pattern; and mapping the submerged hazard to GPS coordinates.

21. A device for rapid marine submerged hazard mapping, the device comprising:

a rotating radar antenna;

an IMU;

a GPS receiver;

at least one computer processor configured to perform operations including at least:

obtaining pitch data, radar data, and position data using the IMU, the radar antenna, and the GPS receiver, respectively;

polar transforming the radar data to cartesian format and co-registering the radar data, the position data, and the pitch data in a cartesian 3D matrix in real-time simultaneously with every rotation of the radar antenna, identifying a wave shoaling pattern using the 3D matrix;

determining a 3D geomorphology of a submerged hazard based on the wave shoaling pattern;

mapping the submerged hazard; and a waterproof enclosure case containing the IMU, GPS receiver, and the at least one computer processor, the waterproof enclosure including a slot to removably couple the radar antenna.

* * * * *